United States Patent [19]

McMichael et al.

[11] Patent Number: 5,542,506
[45] Date of Patent: Aug. 6, 1996

[54] MAGNET-SUPERCONDUCTOR SYSTEMS FOR CONTROLLING AND INFLUENCING RELATIVE MOTION

[75] Inventors: Chase K. McMichael; Ki-Bui Ma, both of Houston; Wei-Kan Chu, Pearland, all of Tex.

[73] Assignee: University of Houston-University Park, Houston, Tex.

[21] Appl. No.: 802,090

[22] Filed: Dec. 3, 1991

[51] Int. Cl.⁶ .................................................... F16F 9/36
[52] U.S. Cl. ............................................ 188/267; 505/100
[58] Field of Search ............................. 188/267; 505/1, 505/700, 902, 4 B, 878, 879; 310/90.5, 152, 153, 154, 156, 26; 192/18 B, 84 PM, 84 A; 60/217

[56] References Cited

U.S. PATENT DOCUMENTS

| | | | |
|---|---|---|---|
| 3,589,300 | 6/1971 | Wipf | 505/903 |
| 4,351,515 | 9/1982 | Yoshida | 188/267 |
| 4,886,778 | 12/1984 | Moon et al. | 505/1 |
| 4,979,445 | 12/1990 | Lanzara | 505/902 |
| 5,071,831 | 12/1991 | Hilal | 505/1 |
| 5,122,509 | 6/1992 | Beetz et al. | 505/1 |
| 5,130,588 | 7/1992 | Armstrong et al. | 505/1 |

FOREIGN PATENT DOCUMENTS

| | | | |
|---|---|---|---|
| 0203730 | 8/1987 | Japan | 188/267 |
| 0150526 | 6/1990 | Japan | 188/267 |
| 1597464 | 10/1990 | U.S.S.R. | 188/267 |

*Primary Examiner*—Matthew C. Graham
*Attorney, Agent, or Firm*—Pravel, Hewitt, Kimball & Krieger

[57] ABSTRACT

Disclosed are devices for influencing and/or controlling relative motion between members, such as vibration damping or absorbing devices, clutches and brakes. The devices comprise a magnet on one member and a field cooled superconductor on the other member. The devices utilize the interaction of the magnetic field of the magnet as it moves through the pinned flux in the superconductor to either influence or control relative motion.

4 Claims, 15 Drawing Sheets

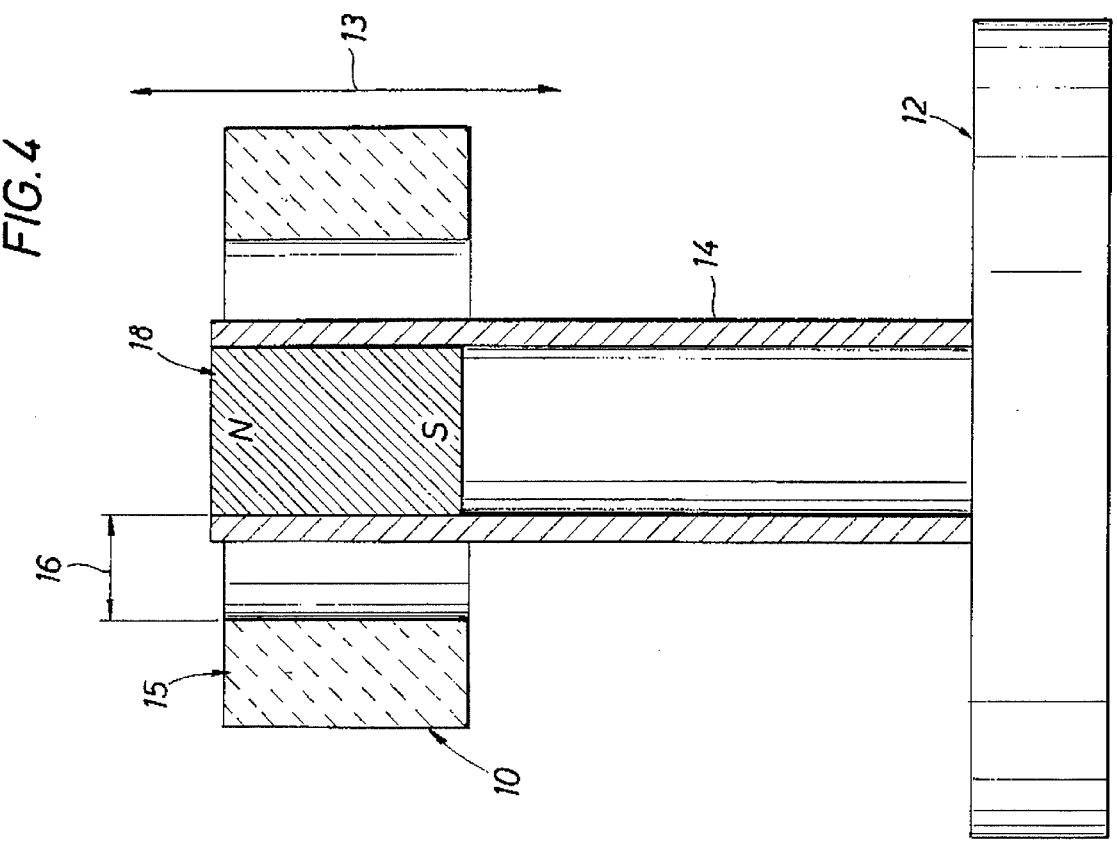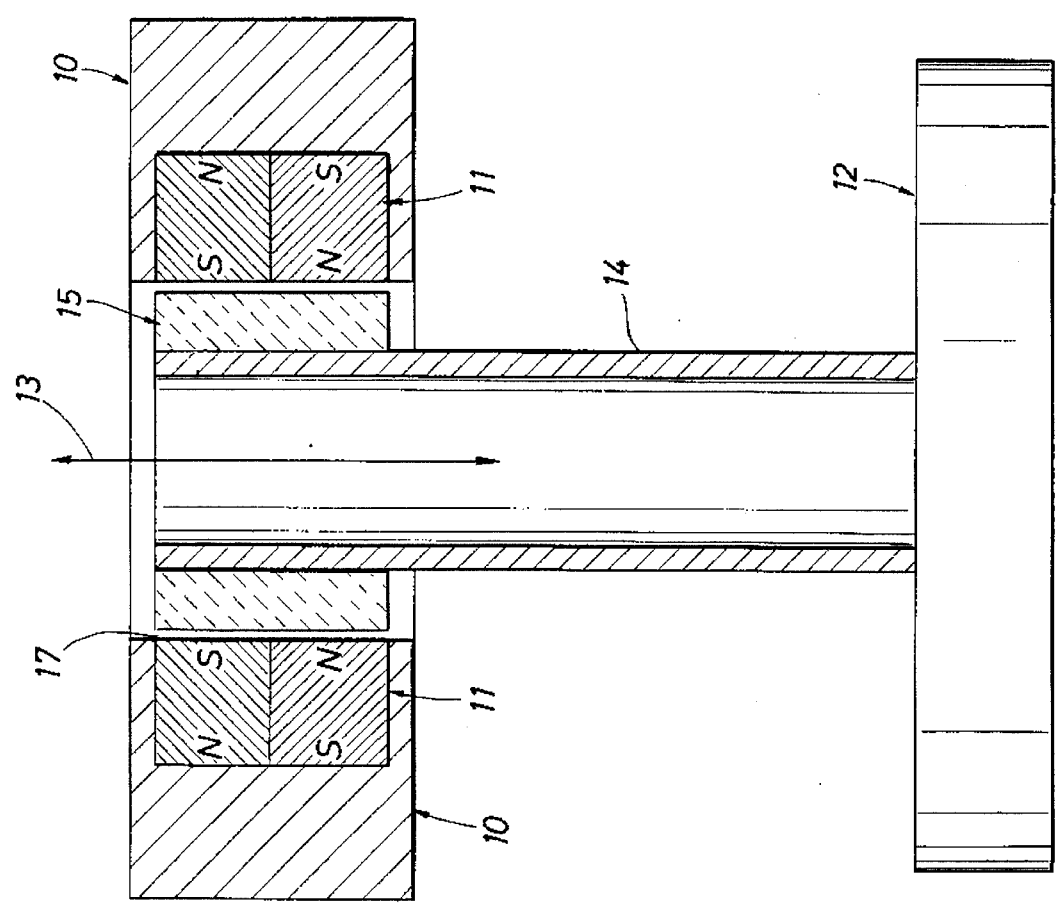

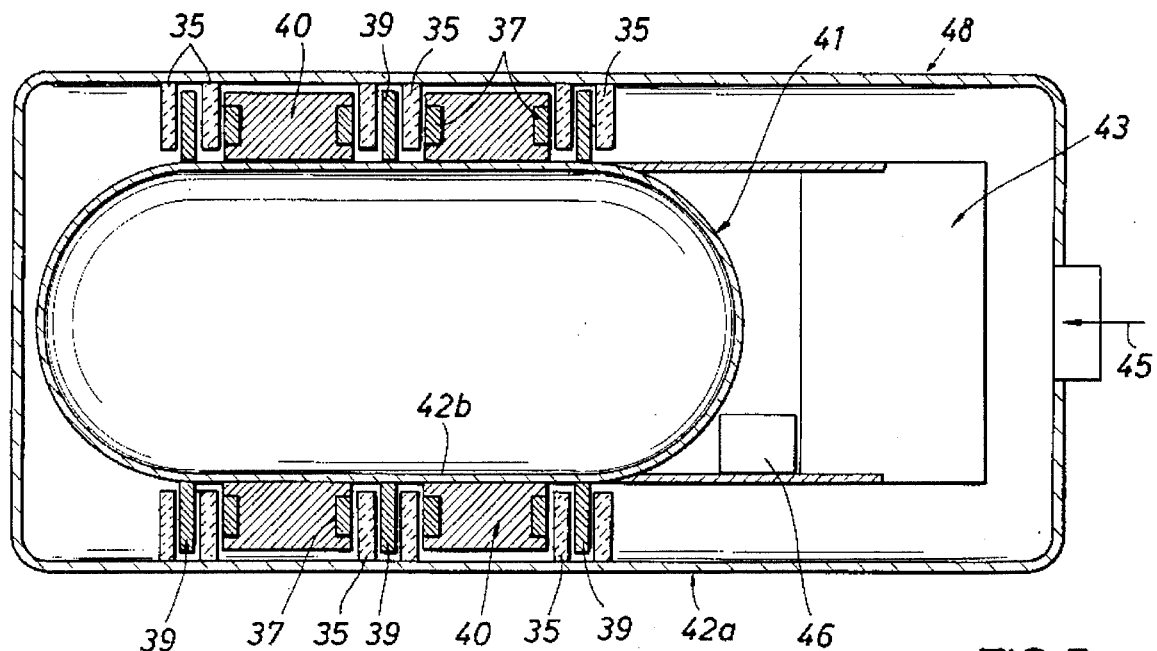
FIG. 7
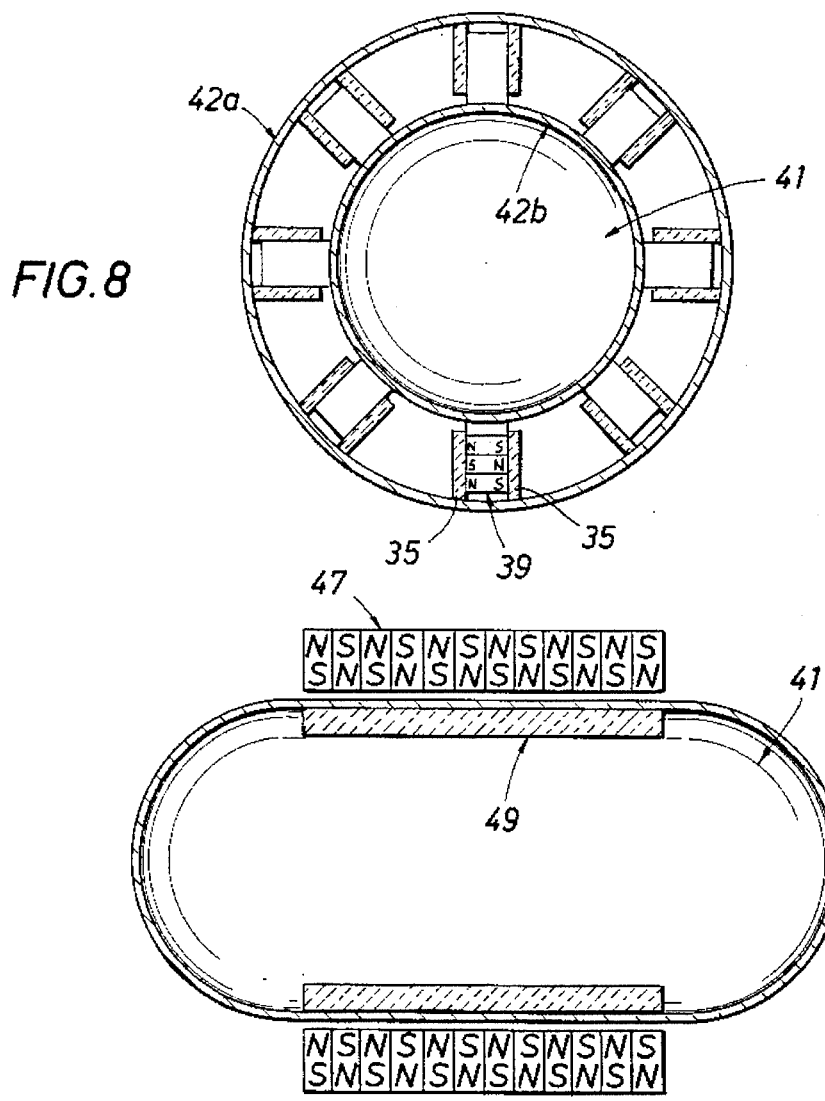
FIG. 8
FIG. 9

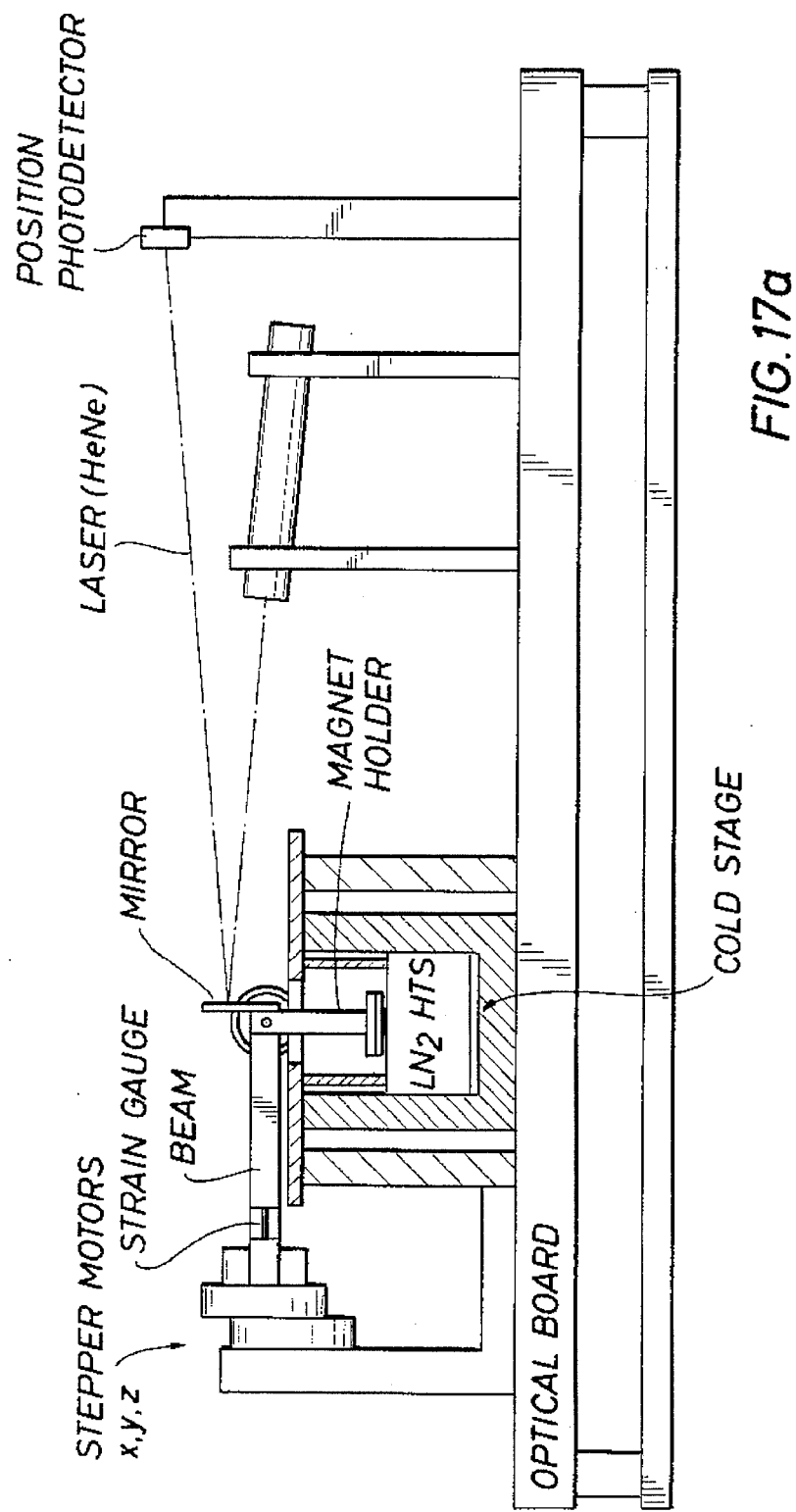
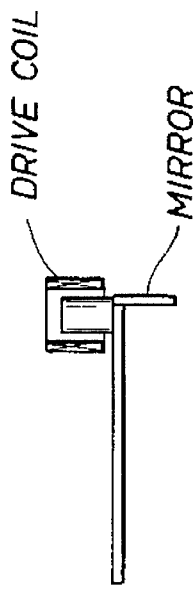
FIG. 17a
FIG. 17b

○ FREE BEAM

○ COPPER

○ FREE-SINTERED

○ MELT-TEXTURED

○ PROTON IRRIDIATED

MAGNET-SUPERCONDUCTOR SYSTEMS FOR CONTROLLING AND INFLUENCING RELATIVE MOTION

BACKGROUND OF THE INVENTION

1. Field of the Invention

The present invention relates to novel magnet-superconductor systems. In another aspect the present invention relates to magnet-superconductor systems useful for controlling and/or influencing relative motion between two or more members. In still another aspect the present invention relates to vibrational damping systems, brakes, clutches, and other articles which utilize magnet-superconductor systems.

2. Description of the Related Art

Many types of prior art devices exist for controlling or infuencing relative motion between two or more bodies. For example, vibration damping systems, brakes and clutches are well known and generally utilize mechanical type of apparatus that are subject to wear, noise, vibration and friction heating problems. These problems can often lead to seizure or other failure of the apparatus. For example, springs or shock absorbers utilized in conventional vibrational control systems tend to wear out with repeated usage over time. Brake pads and mechanical clutches ultimately wear out, and have to be periodically replaced. In additional, mechanical systems often require lubricants which fail in severe environments such as those commonly encountered in outer space. Failure of conventional liquid lubricants in outer space is usually due to the vacuum conditions that cause the lubricants to outgas or vaporize, leaving contact surfaces dry and resulting in the ultimate failure of the apparatus. Additionally, in outer space temperatures are very low so most lubricants solidify and simply do not function as lubricants.

As an alternative to mechanical systems for controlling or influencing motion, magnetic systems have been developed. Conventional magnetic systems for controlling or influencing motion are generally unstable and require for their operability control means, such as rapidly acting feedback control systems, to compensate for displacements from the set point. Until recently, such magnetic systems have utilized magnets of two types—either permanent magnets or electromagnets.

Because field strength of permanent magnets is generally limited, the use of permanents magnets is limited to applications where very small forces are adequate. Electromagnets, which can supply considerably more magnetic force than comparable permanent magnets, are much more convenient to use and are thus preferred for use in conjunction with feedback control systems. However, because of the required feedback control systems, use of electromagnets adds considerably to the cost, size, and operational complexity of the system.

It has been appreciated for years that magnetic fields strongly interact with superconducting materials. The most distinctive property of a superconductive material is its loss of electrical resistance when it is at or below a critical temperature. This critical temperature is an intrinsic property of the material and is referred to as the superconducting transition temperature of the material, $T_c$.

There have been recent advances in superconducting materials and parallel advancements in the field of permanent magnets. Superconductive materials are of two basic types, designated as Type I and Type II. Unlike Type II superconductors, Type I superconductors are incapable of effecting stable suspension.

Type I superconductors feature perfect diamagnetism up to a critical applied field, at which point superconductivity is lost and the magnetization of the sample abruptly disappears. Examples of applications of Type I materials can be found in U.S. Pat. Nos. 3,493,274 and 3,026,151, which disclose a bearing utilizing Type I materials. In order to achieve stability in these systems, the bearing structures must rely on either a mechanical rotary support or must employ superconductors shaped to provide a laterally stable configuration.

The recent discoveries of high temperature superconductors involve Type II materials. Whereas a Type I superconductor completely blocks out magnetic flux from its interior, a phenomenon known as diamagnetism, Type II superconductors allow a certain amount of magnetic flux to penetrate into the interior of the material, producing a stable suspension effect in addition to a levitation effect. Under such conditions, circulating superconducting currents are established within the superconductor.

Recent research activities have brought the discovery of "high temperature superconducting" (HTS) compounds. HTS compounds are those which superconduct at and below a critical temperature, $T_c$, which is above the boiling point temperature of nitrogen.

Following the discovery of superconductivity in a rare earth-alkaline earth-Cu oxide system of a perovskite crystalline structure, a new class of rare earth-alkaline earth-copper oxides was discovered which are superconductive at temperatures above the boiling point of liquid nitrogen, 77° K. These new rare earth-alkaline earth-copper oxides are now commonly referred to as "123" high-temperature superconductors in reference to the stoichiometry in which the rare earth, alkaline earth, and copper metal atoms are present, namely a ratio of 1:2:3.

Since they are superconductive at temperatures greater than 77° K. the new CuO high temperature superconductors may be cooled with liquid nitrogen, which is a far less costly refrigerant than liquid helium. As a result, the rather complex thermal insulation and helium-recycling systems, necessary to avoid wasting the expensive helium coolant required for the low temperature superconducting material previously known, are no longer necessary. The HTS compounds simplify and enhance the reliability of commercial applications of superconductors. Liquid nitrogen is about 2000 times more efficient to use in terms of cost, when both the refrigerant itself and the associated refrigerant unit design are considered.

A typical example of a system featuring a combination of Type II superconductors and permanent magnets is disclosed in U.S. Pat. No. 4,886,778, which discloses a rotating shaft having two ends, each of which contains a permanent magnet and rotates in a socket clad with superconducting material. The shaft is made to levitate above the sockets by the repulsive forces which exist between the magnets and the superconductors. The incorporation of superconductors into the bearing design offers the possibility of rendering the bearings entirely passive. The design disclosed in U.S. Pat. No. 4,886,778 has the potential for achieving very high rotational speeds, in excess of ten thousand rpm. The interaction between the rotating magnetic axial element and its stationary superconducting support takes place across a gap permeated by a strong magnetic field emanating from permanent magnets embedded in the rotating element.

However, while systems featuring Type II superconductors and magnets have been proposed for systems designed to perpetuate motion, such as bearings, these is a need for superconductor/magnet systems for influencing and/or controlling motion.

SUMMARY OF THE INVENTION

The present invention may be used to influence and/or control motion between two or more members. The principle advantage of this invention is that such motion influencing and/or control is achieved without physical contact between the two members. Generally, the apparatus of the invention consists of a magnet on one of the members, and a superconductor on the other member. The superconductor has been field cooled, i.e., cooled to below its $T_c$ in the presence of a magnetic field which then is pinned. This present invention takes advantage of the interaction between the magnetic field and the pinned flux as the magnet and the superconductor are moved relative to each other.

According to the present invention there are provided devices for controlling and/or influencing relative motion between members such as vibration damping systems, brakes and clutches.

According to one embodiment of the present invention there is provided an apparatus for damping the relative motion between a first and second member that are in proximity to and in motion relative to each other. The apparatus comprises a magnet affixed to the first member having a magnetic field profile and a superconductor which is affixed to the second member and that has been field cooled in the presence of a magnetic field, with the magnetic flux being pinned by the superconductor. The magnet and the superconductor are oriented such that as the first and second members move relative to each other, the magnetic field profile of the magnet will move through the pinned magnetic flux profile of the superconductor, and the magnetic field profile of the magnet and the pinned magnetic flux profile of the superconductor are such that as the magnetic field profile of the magnet moves through the pinned magnetic flux of the superconductor, the relative motion of the first and second members is damped. This embodiment has application in devices such as vibration absorption or damping devices and brakes.

According to another embodiment of the present invention there is provided an apparatus for transfering momentum from a one member to another member. The apparatus comprises a magnet affixed to one of the members and having a magnetic field profile and a superconductor which is affixed to the other member that has been field cooled in the presence of a magnetic field, with the superconductor pinning the magnetic flux profile. In operation, as one member is moved past that other member, the magnetic field profile of the magnet will move through the pinned magnetic flux profile of the superconductor, and the magnetic field profile of the magnet and and the pinned magnetic flux profile of the superconductor are such that as the magnetic field profile of the magnet moves through the pinned magnetic flux profile within the superconductor, momemtum is transferred from one member to the other member. This embodiment has application in moving or transporting objects or in clutch type devices.

BRIEF DESCRIPTION OF THE DRAWINGS

FIG. 3 is a side view of a linear vibration absorber and illustrates another embodiment of the present invention.

FIG. 4 is a side view of a linear vibration absorber and is a variation of the linear vibration absorber of FIG. 3.

FIG. 7 is a side view and FIG. 8 a front view of an apparatus in which the present invention is utilized to absorb multi-axis vibration from a pump attached to the cryogenic fluid tank.

FIG. 9 shows a variation in the magnet/superconductor arrangement for tank 41 of FIGS. 7 and 8.

FIG. 17a is a schematic drawing of the apparatus used to study vibrations due to forces acting between magnets and HTS materials.

FIG. 17b is a top view of a portion of the apparatus used to study, vibrations due to forces acting between magnets and HTS materials.

DETAILED DESCRIPTION OF THE INVENTION

The present invention may be used to influence and/or control motion between two or more members. The principle advantage of this invention is that such motion influencing and/or control is achieved without physical contact between the two members. Generally, the apparatus of the invention consists of a magnet on one of the members, and a superconductor on the other member. The superconductor has been field cooled, i.e., cooled to below its $T_c$ in the presence of a magnetic field which then is pinned. This present invention takes advantage of the interaction between the magnetic field and the pinned flux as the magnet and the superconductor are moved relative to each other.

This invention focuses on the profile of the magnetic field in the gap between the magnetic and superconducting surfaces, and the spatial Fourier decomposition of that field in particular. To increase the effective magnetic friction between these two surfaces, the magnetic surface is designed to have a magnetic field with more weight at large wavevectors. One way to achieve this is to reverse the polarity on the magnetization of the material as frequently as possible. For example in one dimension, a magnetic strip comprised of dipole magnets oriented with their dipoles parallel and with the dipoles reversed as much as possible, i.e., N-S-N-S-N-S etc, along the strip. In two dimensions, a "checkerboard" of dipole magnets with their dipoles parallel and polarity reversed as much as possible, i.e., N or S on the black checks and S or N or the white checks. Such a checkerboard or similar pattern will have application in braking or clutching apparatus. There is an optimum, though, since a magnetic field with a high wavevector will not extend very far from the magnetic surface into the superconductor, and would have a correspondingly smaller effect. Thus, it is preferred to increase the component of the magnetic field that has a wavelength in the same order as the gap distance between the magnetic and superconducting surfaces.

Figure 1:
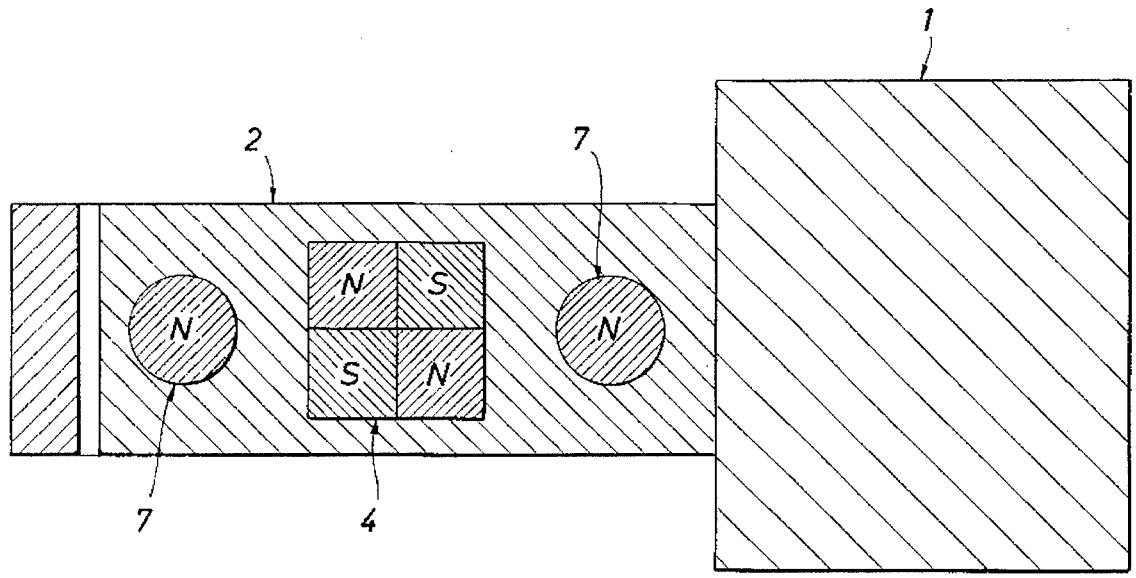
FIGS. 1 and 2 are top and side views of a cryoisolator and illustrate one embodiment of the present invention.
Figure 2:
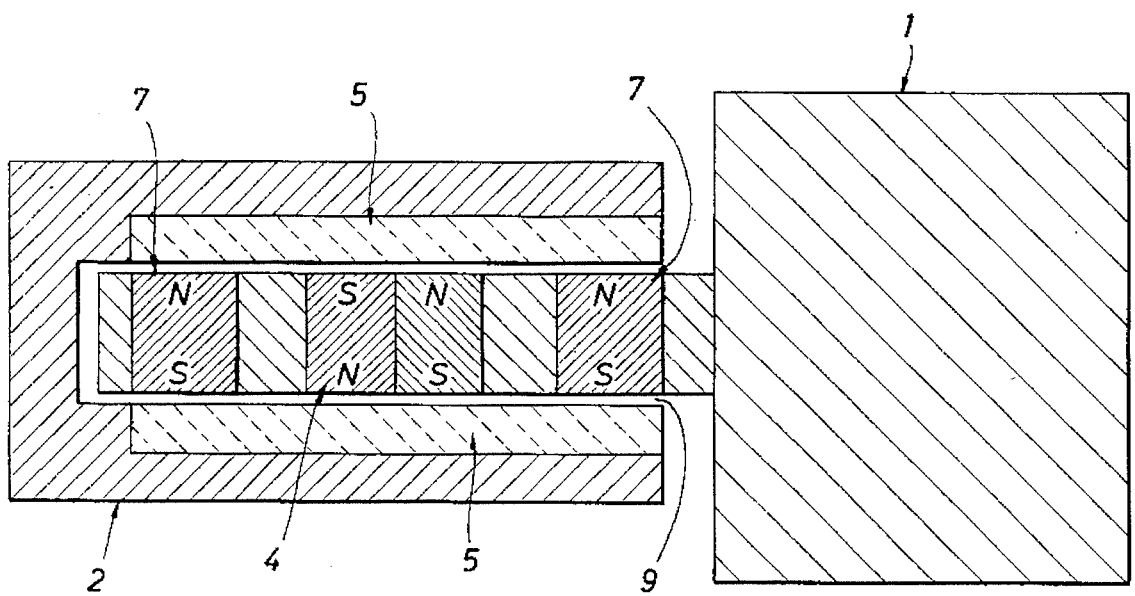

FIGS. 1 and 2 are top and side views of a cryoisolator and illustrate one embodiment of the present invention. The vibration of vibrating member 1 is damped by dipole magnets 7 and multipole magnet 4 attached to vibrating member 1 and by superconductors 5 which are attached to fixed member 2. Superconductors 5 and magnets 4 and 7 are separated by gap 9. The apparatus is first assembled together with superconductors 5 in a normal nonsuperconducting state. Superconductors 5 are then field cooled in the presence of the magnetic fields of magnets 4 and 7. While in this instance it is preferred to field cool superconductors 5 in the presence of magnets 4 and 7, optionally, superconductors 5 could be field cooled in the presence of any suitable magnetic field whose profile would be suitable for damping the vibration of vibrating member 1.

Dipole magnet 7 provides damping in the z direction (out of the page in FIG. 1, up the page in FIG. 2), whereas multipole magnet 4 provides damping in the x and y directions (to the right and up respectively in FIG. 1 and to the right and into the page respectively in FIG. 2).

The apparatus of the present invention will have an effective damping coefficient that will correspond the the traditional damping coefficient of a spring model. The damping coefficient can be adjusted by rearranging superconductor 5 and magnets 4 and 7. Two types of arrangements of these components are the primary factors which will influence the damping coefficient. The first factor is the distance between the two magnets that comprise multipole magnet 4 (the two magnets are together in the embodiment shown), which corresponds to adjusting the wavevector of the dominant Fourier component of the magnetic field in gap 9. The second factor is the distance of gap 9 between superconductor 5 and the multipole magnet 4. Varying these two distances changes the gradient and field density which, in turn, allows control of the damping coefficient. Multipole magnet 4 provides high damping in the plane of the magnet superconductor interface.

FIG. 3 is a side view of a linear vibration absorber and illustrates another embodiment of the present invention. Multipole magnets 11 are attached to fixed member 10. Vibrating member 12 carries a station 14 to the end of which is securely affixed superconductor tube 15. Vibrating member 12 exhibits linear vibration in the direction as indicated by arrow 13. The apparatus is first assembled together with superconductor 15 in a normal nonsuperconducting state with a gap 17 between the magnet and superconducting members. Superconductor 15 is then field cooled in the presence of the magnetic fields of magnets 11. Again, superconductors 15 could be field cooled in the presence of any suitable magnetic field whose profile would be suitable for damping the vibration of vibrating member 12. The vibration of vibrating member 12 is damped as the magnetic field of magnet 11 moves through the trapped magnetic flux profile of superconductor 15.

FIG. 4 is a side view of a linear vibration absorber and is a variation of the linear vibration absorber of FIG. 3. Basically this embodiment illustrates that the magnets and the superconductors may be interchanged and either can be attached to the fixed or the vibrating member. Single dipole magnet 18 is affixed to the station 14 of vibrating member 12 which vibrates in the direction as indicated by arrow 13. Fixed member 10 comprises superconductor 15, which again has been field cooled in the presence of the magnetic field of magnet 18. Distance 16 shows one of the distances that will affect the damping coefficient. The vibration of vibrating member 12 is damped as the magnetic field of magnet 11 moves through the trapped magnetic flux profile of superconductor 15.

Figure 5:
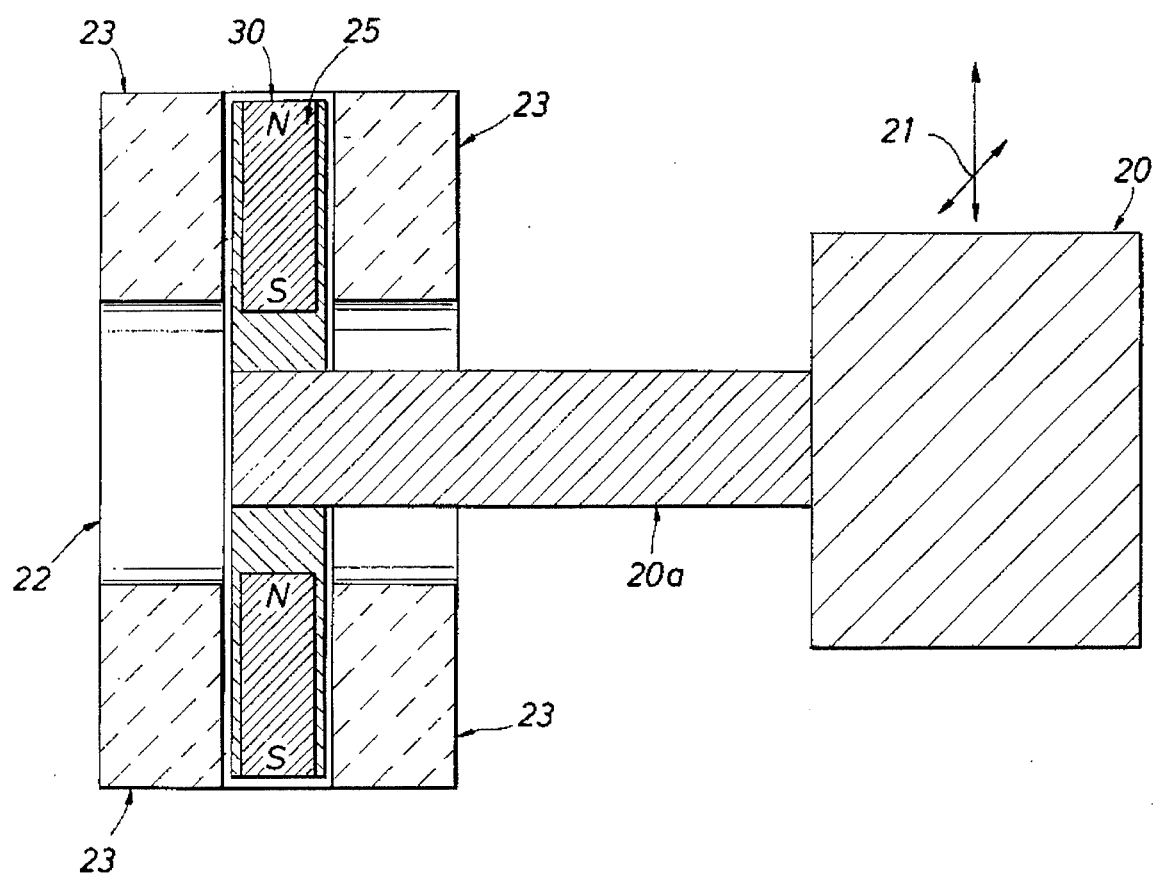
FIG. 5 is a side view of a radial vibration absorber and illustrates yet another embodiment of the present invention.
Figure 6:
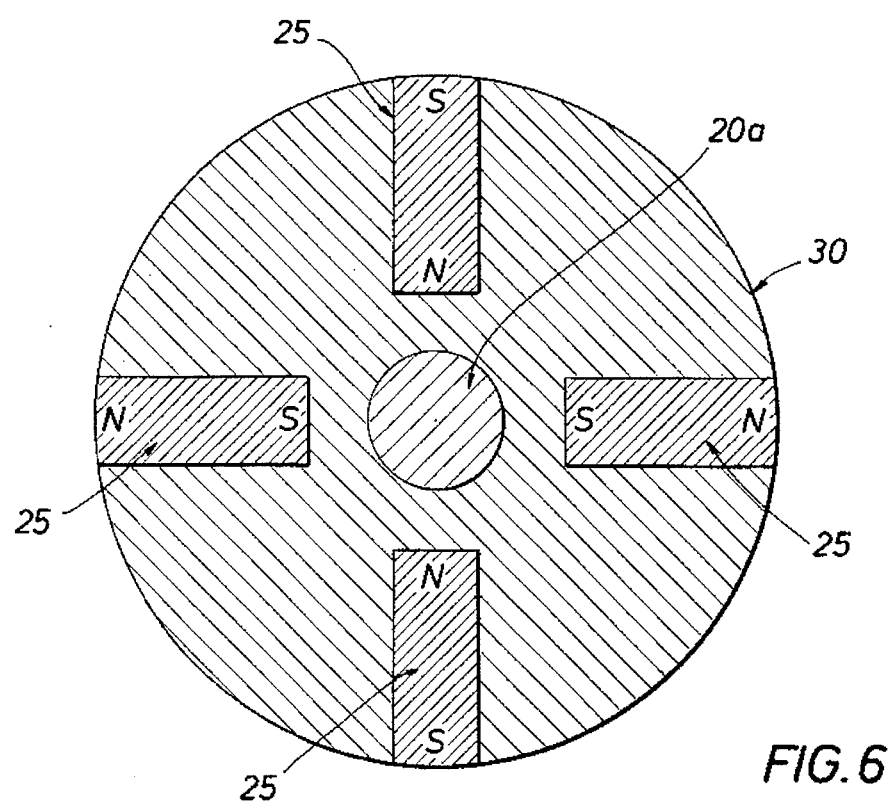
FIG. 6 is a front view of disc 30 of FIG. 5, showing the orientation of magnets 25.

FIG. 5 is a side view of a radial vibration absorber and illustrates yet another embodiment of the present invention. Vibrating member 20 comprises shaft 20a on which is attached disc 30 which contains magnets 25. Vibrating member 20 is vibrating in the directions indicated by arrow 21. Fixed member 22 comprises superconductors 23 which have been field cooled in the presence of a magnetic field whose magnetic field profile is suitable for damping the vibration of vibrating member 20. FIG. 6 is a front view of disc 30 of FIG. 5, showing the orientation of magnets 25. The vibration of vibrating member 20 is damped as the magnetic field of magnets 25 move through the trapped magnetic flux profile of superconductors 23.

The present invention may also be utilized in an optical system, consisting of a focal plane array together with tracking and pointing mirrors or lenses, operating under cryogenic conditions maintained by other devices such a cryoturboexpanders, turboalternators, or Stirling cycle coolers that create mechanical vibrations, degrading the resolution of the optical detection.

FIG. 7 is a side view and FIG. 8 a front view of an apparatus in which the present invention is utilized to absorb multi-axis vibration from a pump attached to the cryogenic fluid tank. Cryogenic fluid tank 41 contains a cryogenic fluid such as, for example, liquid nitrogen or liquid helium. Cold optical sensors 43 detect light traveling along optical path 45. Attached to housing 48 are superconductors 35. Multipole magnets 39 are affixed to tank 41 by inner magnet holder 42b and outer magnet holder 42a, and dipole magents 37 are attached to tank 41 by magnets holders 40. A gap or spacing is provided between each magnet and each superconductor. Superconductors 35 have been field cooled in the presence of a magnetic field whose magnetic field profile is suitable to allow damping of the vibration of cyropump 46. The vibration of cryopump 46 is damped as the magnetic fields of magnets 37 and 39 move through the trapped magnetic flux in superconductors 35.

FIG. 9 shows a variation in the magnet/superconductor arrangement for tank 41 of FIGS. 7 and 8. Superconductor 49 is placed within the cryogenic fluid and magnet 47 is affixed to housing 48 (shown in FIG. 7).

FIGS. 1 through 9 have illustrated embodiments of the present invention utilized in absorbing or damping vibrations. The following embodiments illustrate the present invention utilized in devices such as brakes or clutches.

Figure 10:
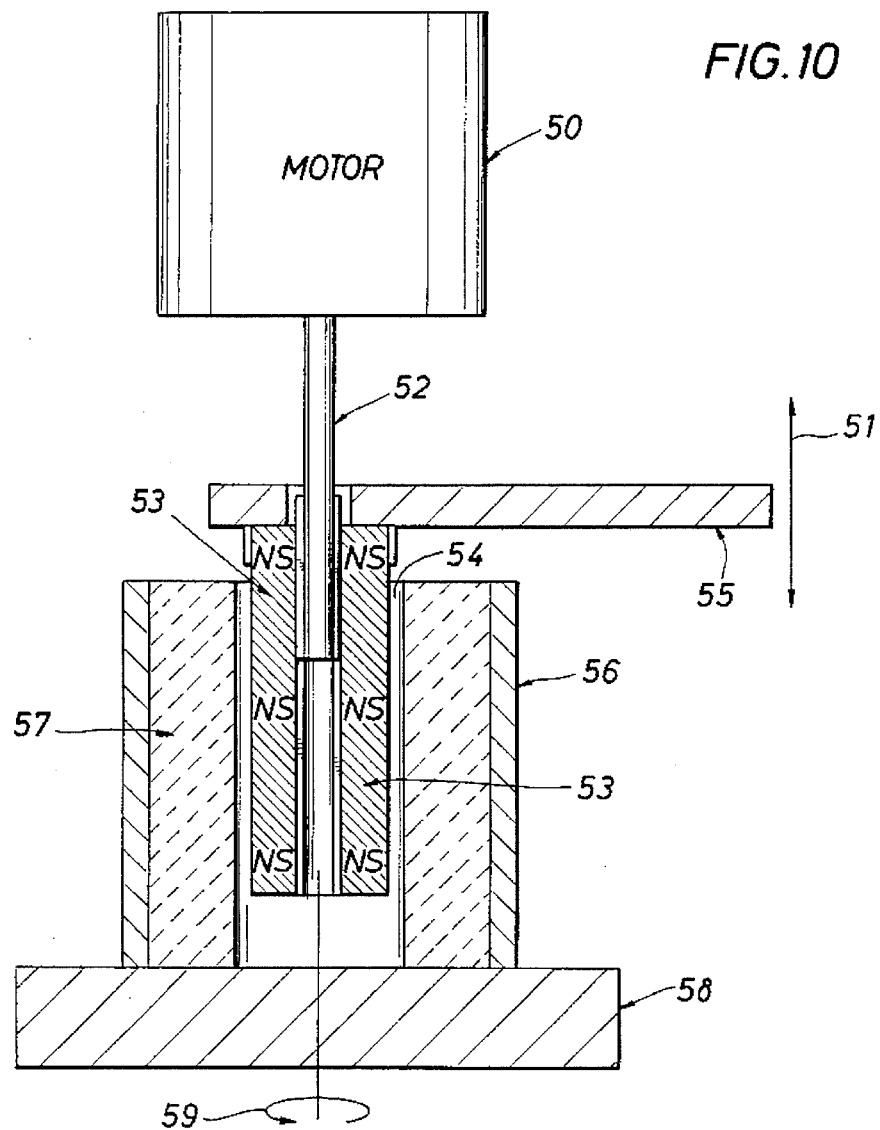
FIG. 10 illustrates a linear superconducting magnetic clutch.

FIG. 10 illustrates a linear superconducting magnetic clutch. Motor 50 drives shaft 52 to which is connected multipole magnetic shaft 53. Clutch member 58 comprises holder 56 and superconductor 57 which receives magnetic shaft 53. Space gap 54 is the distance between magnetic shaft 53 and superconductor 57. Superconductor 57 has been field cooled in the presence of a magnetic field whose magnetic field is suitable to allow shaft 53 to drive clutch member 58 about its rotational axis as indicated by arrow 59, as the magnetic field of magnetic shaft 53 passes through the pinned magnetic flux within superconductor 57. One suitable magnetic profile would be of the "checkerboard" type discussed above. The degree of the magnetic engagement of magnetic shaft 53 with superconductor 53 can be varied by control means 55 which allows shaft 53 to be moved in the direction indicated by arrow 51. When shaft 53 is fully inside clutch member 58, the maximum magnetic engagement torque is transferred. When shaft 53 is half way inside clutch member 58, half as much torque is transferred. The transfer of torque is linearly related to the degree of magnetic engangement of shaft 53 with member 58.

Figure 11:
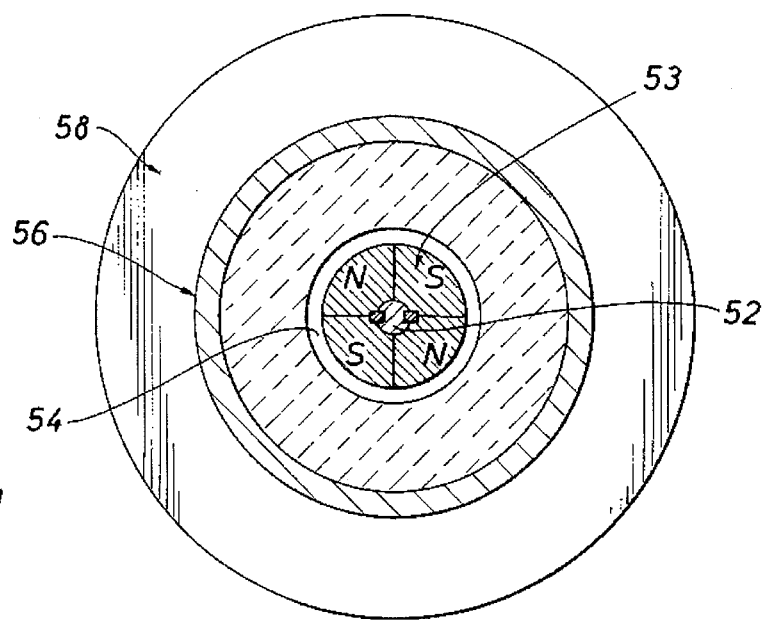
FIG. 11 shows the relationship in FIG. 10 of superconductor 57, superconductor holder 56, shaft 52, magnetic shaft 53, and air gap 54.

FIG. 11 shows the relationship in FIG. 10 of superconductor 57, superconductor holder 56, shaft 52, magnetic shaft 53, and gap 54.

Figure 12B:
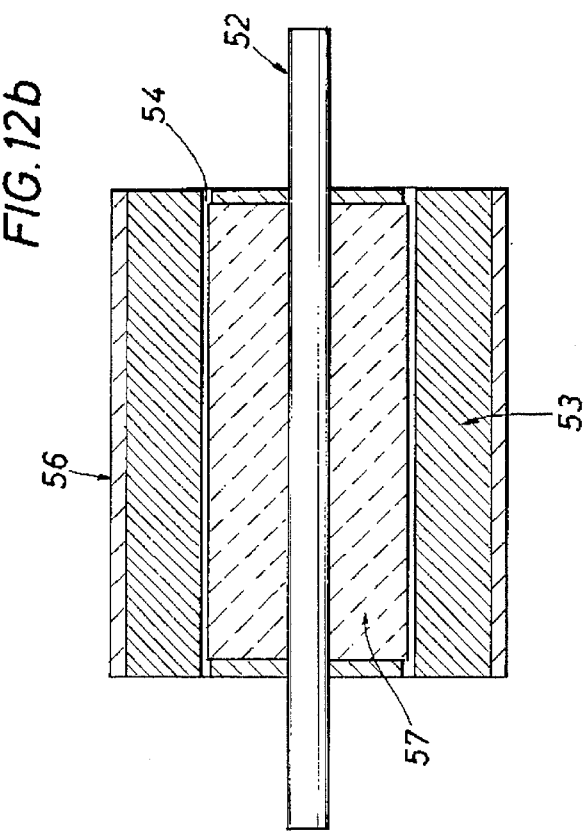
FIGS. 12a and 12b show portions of a clutch that is an alternate embodiment to the clutch shown in FIGS. 10 and 11.
Figure 12A:
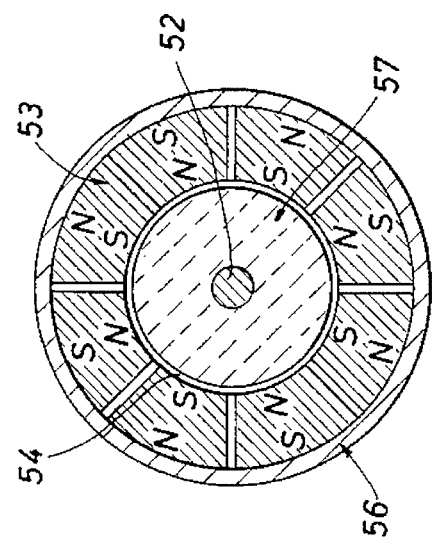

FIGS. 12a and 12b show portions of a clutch that is an alternate embodiment to the clutch shown in FIGS. 10 and 11. In this embodiment, the positions of the superconductor and the magnets are reversed. Superconductor 57 is located on shaft 52, and the magnets 53 are located on the clutch member and secured in place by holder 56. Gap 54 is the distance between superconductor 57 and magnets 53.

Figure 13:
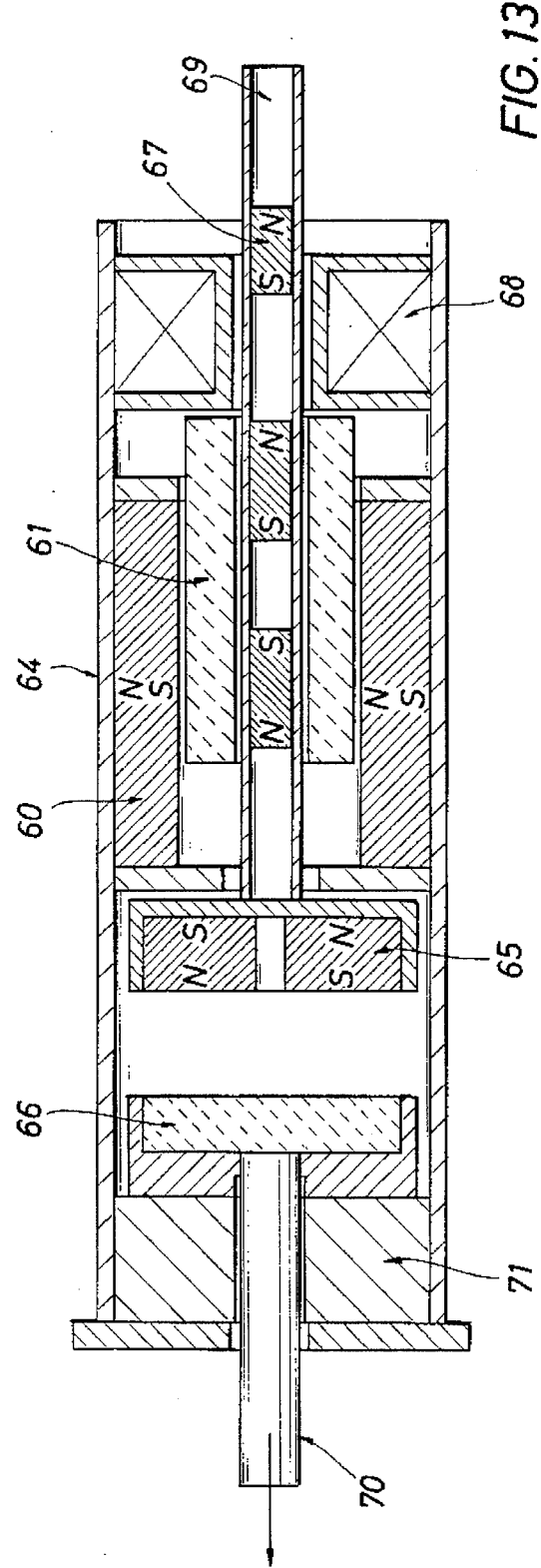
FIG. 13 illustrates a superconductor/magnet clutch system that also utilizes a superconducting bearing.

FIG. 13 illustrates a superconductor/magnet clutch system that also utilizes a superconducting bearing. The bearing comprises linear bearing magnets 60 affixed to housing 64 and bearing superconductors 61 affixed to shaft 69. Electromagnetic coil 68 in cooperation with magnets 67 along shaft 69 are used for engaging and disengaging the clutch. The clutch consists of superconductor clutch pad 66 and clutch magnets 65. Superconductor clutch pad 66 has been field cooled in the presence of a magnetic field suitable to allow clutch pad 66 to be driven and engaged by clutch magnets 65, as the magnetic field of magnets 65 pass through the pinned magnetic flux within clutch pad 66. The rotational energy of shaft 69 is transferred to shaft 70, encased in member 71, through clutch pad 66 and clutch magnets 65.

Figure 14:
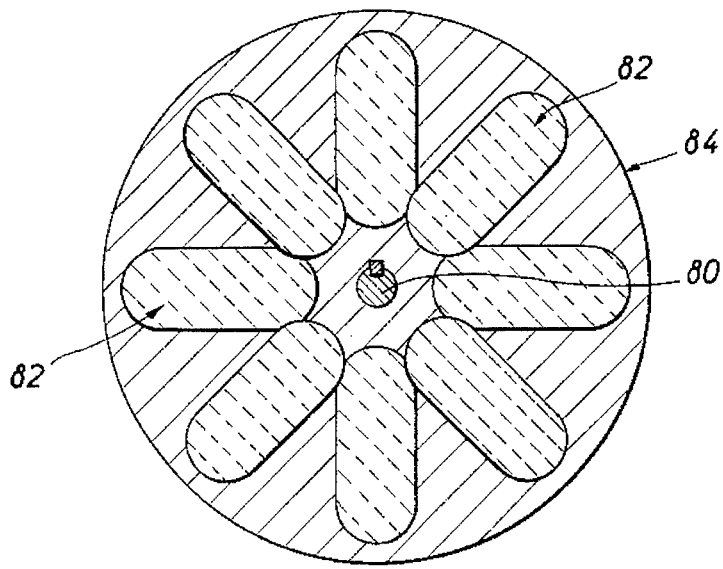
FIG. 14 shows a brake plate for a superconducting magnetic brake.
Figure 15:
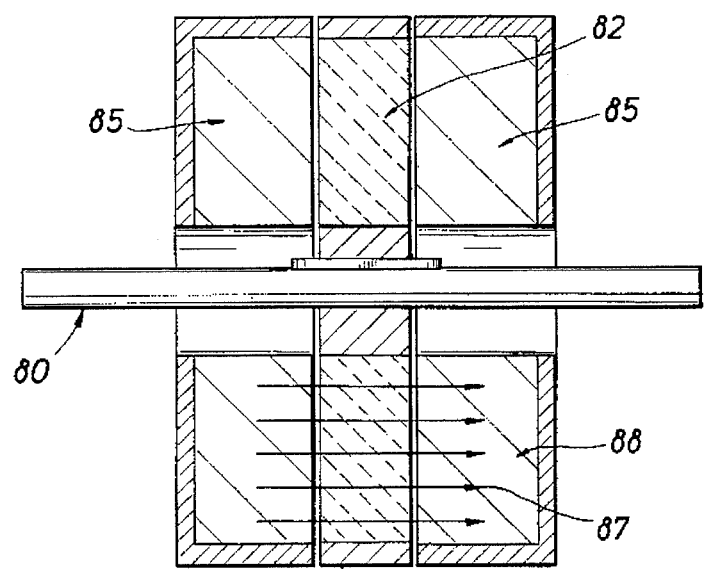
FIG. 15 shows a superconducting magnetic brake system.

FIG. 14 shows a brake plate for a superconducting magnetic brake. FIG. 15 shows a superconducting magnetic brake system. Brake plate 84 comprises superconductors 82 that extend radially out from shaft 80. Alternating electromagnetic poles are supplied by electromagnets 85. The magnetic flux path is shown by arrows 87. Superconductors 82 have been field cooled in the presence of a suitable magnetic field to create a sufficient high drag torque to cause braking action as the pinned flux of the superconductors 82 is moved through the magnetic field of electromagnets 85.

Figure 16:
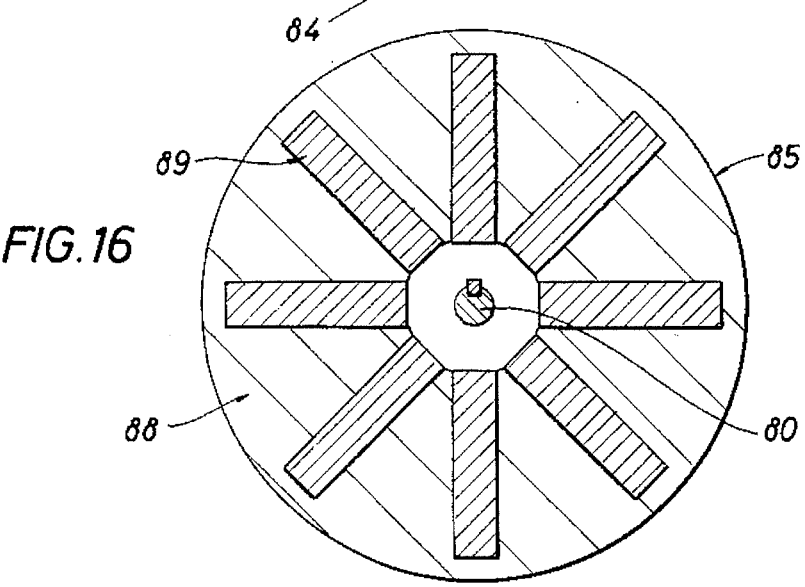
FIG. 16 shows a detail view of electromagnets 85 of FIG. 14, showing shaft 80, copper winding area 88 and Si and Fe lamination strips 89.

FIG. 16 shows a detail view of electromagnets 85 of FIG. 14, showing shaft 80, copper winding area 88 and Si and Fe lamination strips 89.

With the proper geometric arrangement and orientation of magnets, the present invention can be utilized to allow motion or transportation in one plane while restraining motion in another plane.

To prepare the precursor composition from which the HTS compound will be prepared, any of the three commonly employed techniques may be used, namely the solid state, the coprecipitation, and the sol-gel techniques. A description of these techniques may be found in *Proceeding on the Symposium on High Temperature Superconducting Materials, University of North Carolina, Chapel Hill, N.C.*, W. E. Hatfield and J. H. Miller, Jr. (Eds.), M. Dekker, New York (1988), all herein incorporated by reference. An HTS material of sufficient critical current density, $J_c$, can be made by the methods disclosed in application Ser. No. 723,405, filed Jul. 1, 1991 by W. K. Chu et al., entitled "*Method for producing formed bodies of high temperature superconductors having high critical currents*," herein incorporated by reference.

The HTS materials of the present invention are preferably 123 materials. Following the discovery of superconductivity in a rare earth-alkaline earth-Cu oxide system of a perovskite crystalline structure, a new class of rare earth-alkaline earth-copper oxides was discovered which are superconductive at temperatures above the boiling point of liquid nitrogen, 77° K. These new rare earth-alkaline earth-copper oxides are now commonly referred to as "123" high-temperature superconductors in reference to the stoichiometry in which the rare earth, alkaline earth, and copper metal atoms are present, namely a ratio of 1:2:3.

The 123 high temperature superconducting compounds have a perovskite related crystalline structure. The unit cell of such 123 compounds consists of three subcells in alignment along the crystallographic c-axis wherein the center of the middle subcell is occupied by a rare earth metal atom, the center of each end subcell is occupied by an alkaline earth metal atom, and copper atoms occupy the corner positions in each subcell. X-ray and neutron powder diffraction studies indicate the structure of superconductive 123 compounds to be oxygen deficient and that the ordering of oxygen in the basal planes is critical to the existence of superconducting properties in such compounds. See C. Poole et al, *Copper Oxide Superconductors* (John Wiley & Sons 1988).

The unit cell formula of the 123 compound is $L_1M_2Cu_3O_{6+\delta}$ ($\delta=0.1$ to $1.0$, preferably about $1.0$) wherein the rare earth metal constituent, L, is yttrium, lanthanum, neodymium, samarium, europium, gadolinium, dysprosium, holmium, erbium, thulium, ytterbium, or lutetium, or mixtures thereof including mixtures with scandium, cerium, praseodymium, terbium and the alkaline earth constituent, M, is barium, strontium or mixtures thereof. Studies indicate that when δ is between about 0.1 to about 0.6, the resulting 123 compound assumes a tetragonal unit cell crystallographic symmetry and is non-superconductive. In the tetragonal unit cell symmetry, the lattice dimension of the c-axis is approximately 11.94 angstroms and that of the a and b axis is equal, approximately 3.9 angstroms. When δ is between 0.7 and 1.0, the resulting 123 compound has an orthorhombic unit cell crystallographic symmetry and is superconductive. The orientation of the oxygen atoms in the unit cell causes the unit cell to compress slightly along the a crystallographic axis and thus the lattice dimension of the a axis is less than that of the b axis. Lattice constants in the orthorhombic symmetry are about a=3.82, b=3.89 and c=11.55 angstroms.

The HTS material utilized in the present invention is preferably melt-textured. Melt-texturing is a well known process for preparing HTS materials. In a melt-textured growth process for preparing bodies of $Y_1Ba_2Cu_3O_{6+\delta}$ all portions of the entire body are simultaneously first elevated in temperature beyond the peritectic temperature of the compound to melt the 123 compound incongruently into $Y_2BaCuO_5$ and a liquid phase. Thereafter the body is allowed to cool, at a controlled rate (dT/dt), to a temperature below the solidus temperature wherein the $Y_2BaCuO_5$ and liquid phase react to reform the 123 compound which crystallizes. In the melt-textured growth process reported by Jin et al. in *Appl. Phys. Lett.*, Vol. 52, pp. 2074–2076(1988) and Vol. 54, pp. 584–586 (1989) and Murakami et al. in *Jpn. J. Appl. Phys.*, Vol. 28, pp. L1125–1127 (1989) the entire body of 123 compound is first heated above the solidus or peritectic temperature and thereafter the entire body is subjected to a not well defined thermal gradient to promote directional solidification of the 123 grains as the body is permitted to cool at a controlled rate to a temperature below the solidus temperature. With such melt-textured growth procedure Jin et al. has reported bodies prepared with a zero field transport critical current density at 77 K of. 17,000 A/cm². Others have employed a modified version of melt texture growth wherein after an entire body has first been heated to a temperature above the peritectic temperature the body compound is then cooled at a time cotrolled rate without being subjected to a thermal gradient. See, Salama et al., *Appl. Phys. Lett.*, vol. 54, pp. 2352–2354. The procedure of Salama et al. reports the formation of $Y_1Ba_2Cu_3O_{6+\delta}$ bodies having current densities in excess of 37,000 A/cm² in a magnetic field of 6000 G. Salama et al., emphasize grain growth by cooling of the body at a time controlled rate in the absence of an imposed thermal gradient (dT/dx) upon the body.

By use of a "melt textured growth" process, a number of groups have reported making 123 compound bodies of enhanced $J_c$. To date the highest reported $J_c$ of a 123 body prepared by a melt textured growth technique is $1.7 \times 10^4$ A/cm² by Jin et al., *Phys. Rev. B.*, Vol. 37, pp. 7850–7853 (1988) and *Appl. Phys. Lett.*, Vol. 42, pp. 2074–2076 (1988); later Salama et al. employed a liquid-phase processing method to obtain a $J_c \sim 7.5 \times 10^4$ A/cm²; both in bulk $YBa_2Cu_3O_{7-\delta}$ (Y123) at 0 T and 77 K after prolonged oxygen annealing. In each method of body treatment the enhanced $J_c$ has been ascribed to the drastically improved grain alignment, phase purity, and densification in $Y_1Ba_2Cu_3O_{6+\delta}$ compound of which the body is composed.

In certain applications for controlling and/or influencing motion utilizing the present invention, it may be necessary to have an HTS compound fabricated into usable body shapes, such as plate, rod, wire, or ribbon, of large dimensions with controllable grain orientation and large $J_c$ to carry large total current loads. Although promising for 123 bodies of enhanced $J_c$, the melt textured growth techniques—since they require temperature programming of a furance in which the entire body article is placed—possess a limitation to the size of the body produced, i.e., it cannot be greater than that of the furnace. Melt textured growth and liquid-phase techniques reported so far are limited to batch production. To alleviate the impasse, one needs to fabricate the body in a continuous fashion.

The HTS material utilized in the present invention may also be prepared by the continuous melt-texturing process of application Ser. No. 701,677, filed May 16, 1991 by C. W. Chu et. al, and herein incorporated by reference. That process is one which continuously produces a 123 HTS compound body of desired dimensions which is in the form dictated by the application for which such body is particularly intended.

The process of Chu et al. produces bodies composed of a 123 HTS compound in a rod/wire/ribbon/film/plate body form of any desired dimensions. These bodies of 123 compound are dense, of low micro-crack content, low in nonsuperconducting impurity content, and of highly aligned "ab" planes with low angle grain boundaries—i.e., of oriented grain growth; so that such 123 HTS compound bodies have the $J_c$ and total current carrying capacity required for the application for which such body shape is most suited.

To enable the continuous growth of a 123 compound body of large dimensions with a pre-determined body form to carry large $J_c$ and to provide the capability for the removal of impurity phases, a 123 precursor composition molded to a predetermined body form is moved at a predetermined speed (dx/dt) through a furnace in which a narrow portion of such body form is, in relationship to each successive immediately adjacent narrow portion of such body form, briefly subjected to heating to a temperature $T_2$ of from about 80° to about 150° C. above the peritectic temperature of the 123 compound as to which the composition of such body form is a precursor composition. As that so superheated portion of the body moves out of the $T_2$ superheated zone into a zone having a preset temperature gradient profile (dT/dx), that superheated body portion is rapidly cooled to a temperature $T_3$ which is about 10° to 40C.° ("C°" meaning a range of temperature above or below a particular temperature, °C.) above the peritectic temperature of the 123 HTS species. As that portion of the body advances through the second zone its temperature is reduced to a final second zone temperature of $T_4$ which is about 60° to 120° C. below the peritectic temperature. At all times while in the zone of present temperature gradient profile all portions of the body in such zone are subject to a pre-set temperature gradient (dT/dx) while such body portions undergo cooling according to a rate (dT/dt) controllable in terms of the traversing speed (dx/dt) through such zone. The presence of a preset temperature gradient profile, dT/dx, determines the grain growth direction of 123 grains in the body form. Both the rate of body travel, dx/dt, and the profile of the preset temperature gradient, dT/dx, are chosen to give the desired dT/dt for highly aligned grain growth.

The Chu et al. melt-texturing process comprises the steps of moving a preformed body composed of 123 precursor composition, preferably a composition which is precursor to the formation of or is a compound of the $Y_1Ba_2Cu_3O_{6+\delta}$ HTS species, through a superheated zone, wherein progressively a portion of such body precursor composition first becomes rapidly superheated for a short time to a temperature greater than the peritectic temperature of the 123 species to which such body composition is a precursor; continuing movement of such body article through and out of said superheated zone at a travel rate of dx/dt to a subsequent temperature profiled zone wherein the temperature of the superheated portion of such body article form is first reduced in temperature to a temperature slightly above the peritectic temperature after which as that body portion moves through the subsequent zone the temperature of that body portion is progressively allowed to cool, by a rate of from about 0.5° C./hours to about 3° C./hour to a temperature of from about 60° to about 120° C. below the pertitectic point of the 123 HTS compound of which such portion of said body is composed; and, preferably, exposing said body portion while at a temperature of about 400° C. below the peritectic point of said 123 compound of which said body is composed to an oxygen atmosphere until said portion of the body reaches a temperature of about 400° C. and continuing movement of such body article until all portions of such body are passed through said superheated zone, said temperature profiled subsequent zone and preferably, through said oxygen containing atmosphere.

Treatment of such a preshaped body article of 123 precursor composition by the Chu et al. melt-texturing process may be conducted in a continuous manner and the final 123 HTS compound shaped body article so produced has at least the minimum $J_c$ required for practical application of such shaped body article of 123 HTS compound for controlling and/or influencing relative motion between two or more members.

EXAMPLES

FIG. 17a is a schematic drawing of the apparatus used to study vibrations due to forces acting between magnets and HTS materials. FIG. 17b is a top view of a portion of the apparatus used to study vibrations due to forces acting between magnets and HTS materials. The magnet was attached to a cantelever beam on one end. It was lowered to 0.3 mm above the sample plate (YBCO or Cu). Both a strain gauge and a mirror were attached to the cantelever beam to monitor the deflection of the beam. Then the displacement of the magnet and the forces acting on it can be deduced either from the electrical signals coming out of the guage, or the deflection of a laser beam reflected from the mirror. For quasi-static measurements the magnet can be moved by a stepper motor, to which the other end of the cantelever beam is attached. To measure the resonance response of the beam-magnet-sample system, vibrations are forced upon the beam via another permanent magnet and an electrical coil. Finally, natural vibrations can be studied by starting the motion with a random tap on the beam, usually with extra mass attached.

Figure 18A:
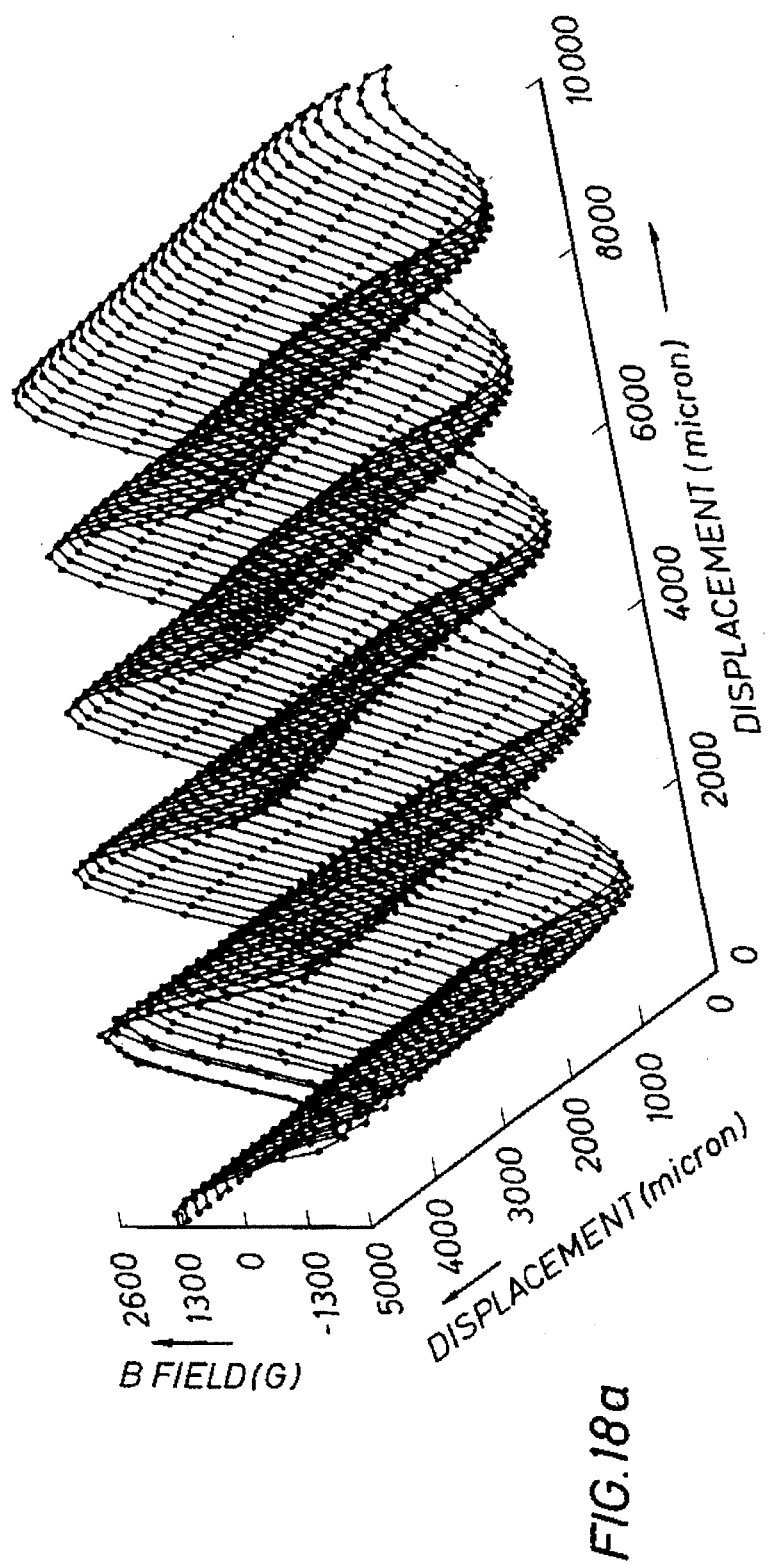
FIG. 18a shows the profile of the magnetic field (normal componenet) of the magnet of FIG. 17, at a distance of 0.3 mm.
Figure 18B:
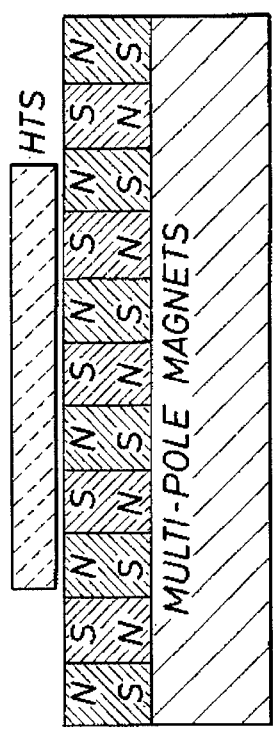
FIG. 18b shows the magnet utilized in the apparatus of FIG. 17 and it consists of a strips of dipoles of alternating polarity.

The magnet utilized consists of strips of dipoles of alternating polarity, and is shown in FIG. 18b. The profile of the magnetic field (normal component) at a distance of 0.3 mm is shown in FIG. 18a.

Figure 19:
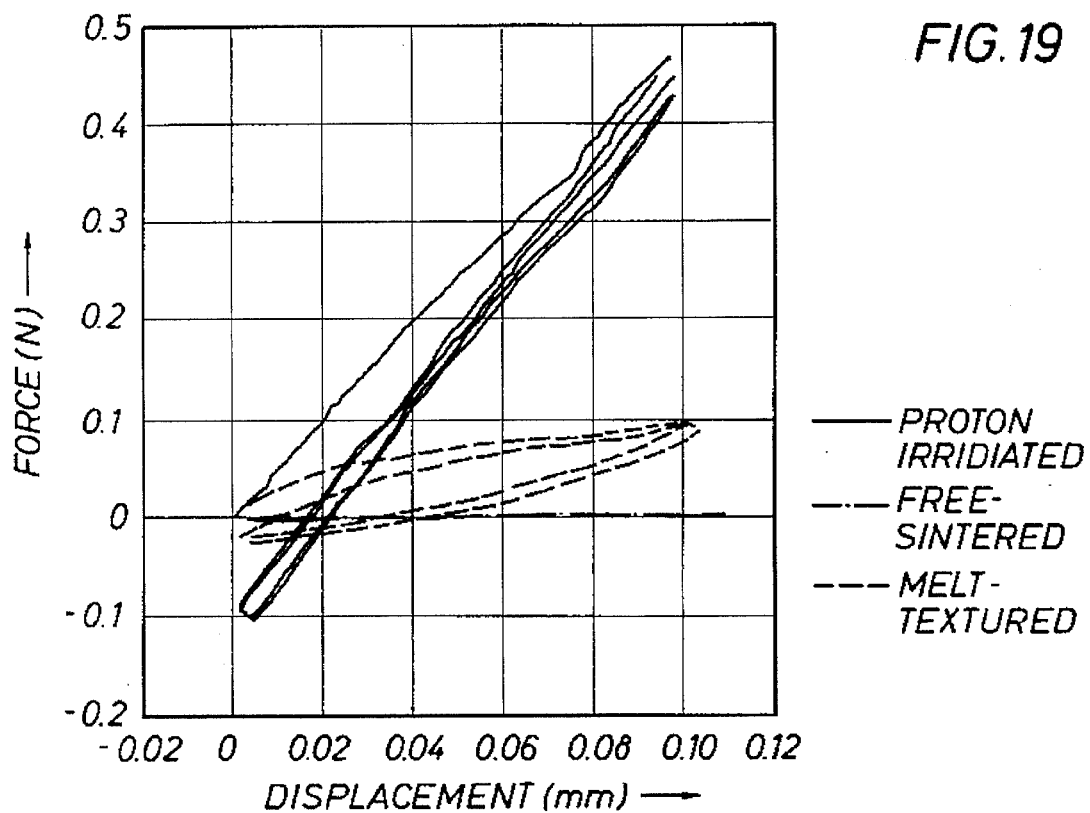
FIG. 19 shows the static force hysteresis loops from moving the striped magnet of FIG. 17 back and forth with a span of 0.1 mm at a distance of 0.3 mm above a sample of (a) free sintered $Y_1Ba_2Cu_3O_{6+d}$, where d=0.1 to 1 (hereafter "YBCO"), (b) melt-textured YBCO, and (c) melt-textured YBCO irradiated with protons at 200 MeV.
Figure 20:
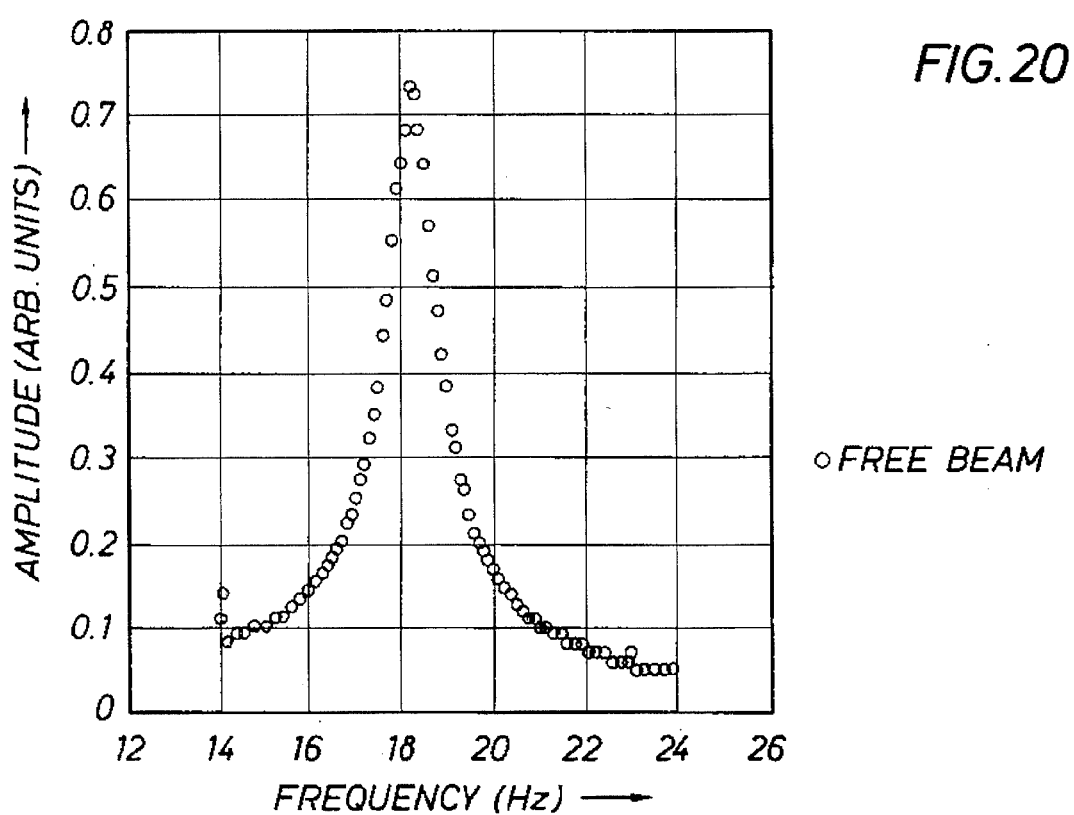
FIGS. 20, 21, 22, 23, and 24 show the resonance responses of the cantelever beam of FIG. 17 with the striped magnet (a) only; and with a sample of (b) Cu; (c) free sintered YBCO; (d) melt-textured YBCO; (e) irradiated (200 MeV protons) melt-textured YBCO.
Figure 21:
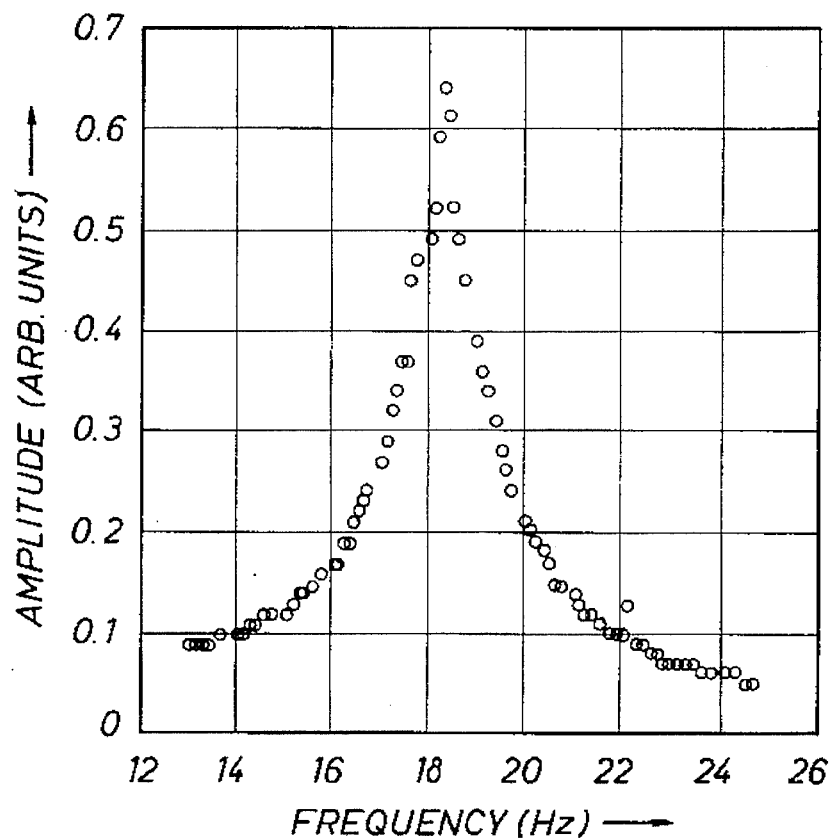
Figure 22:
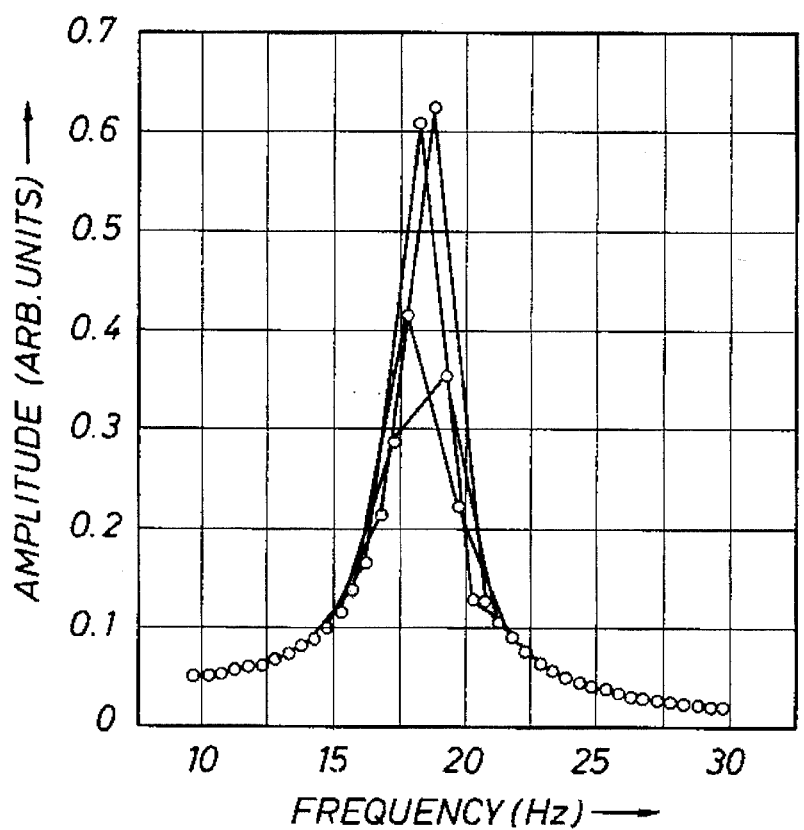
Figure 23:
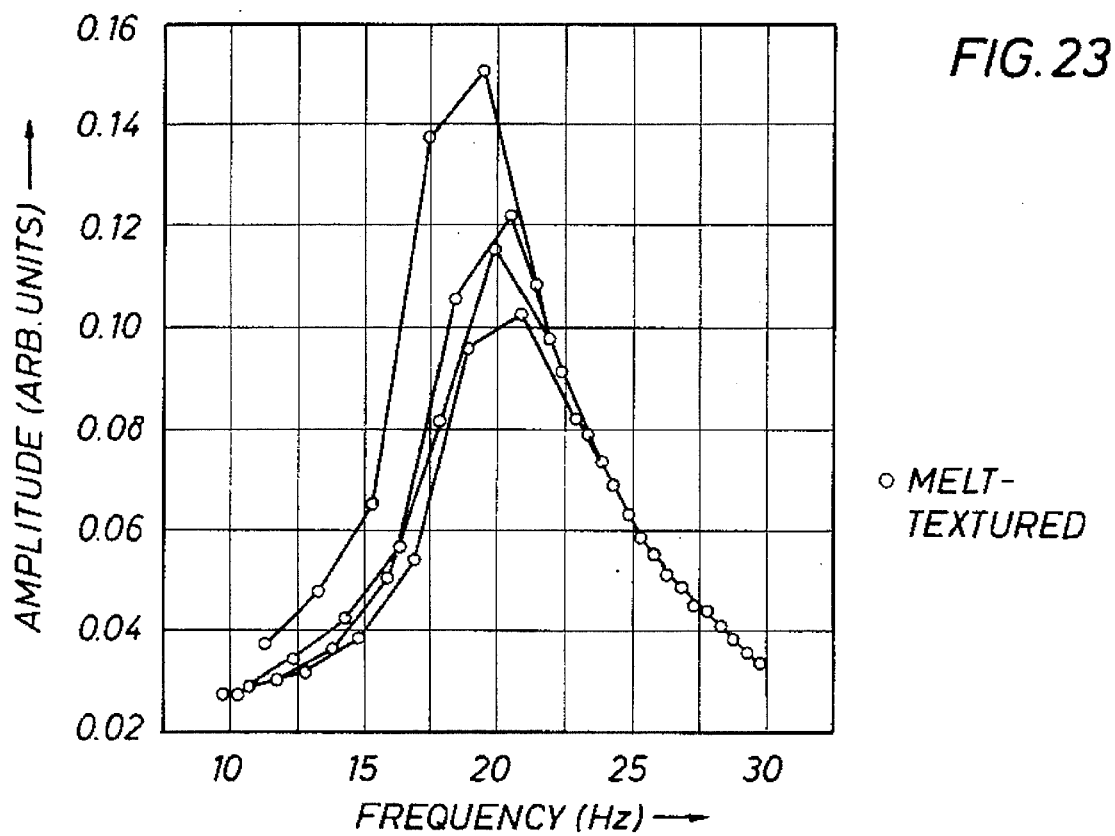
Figure 24:
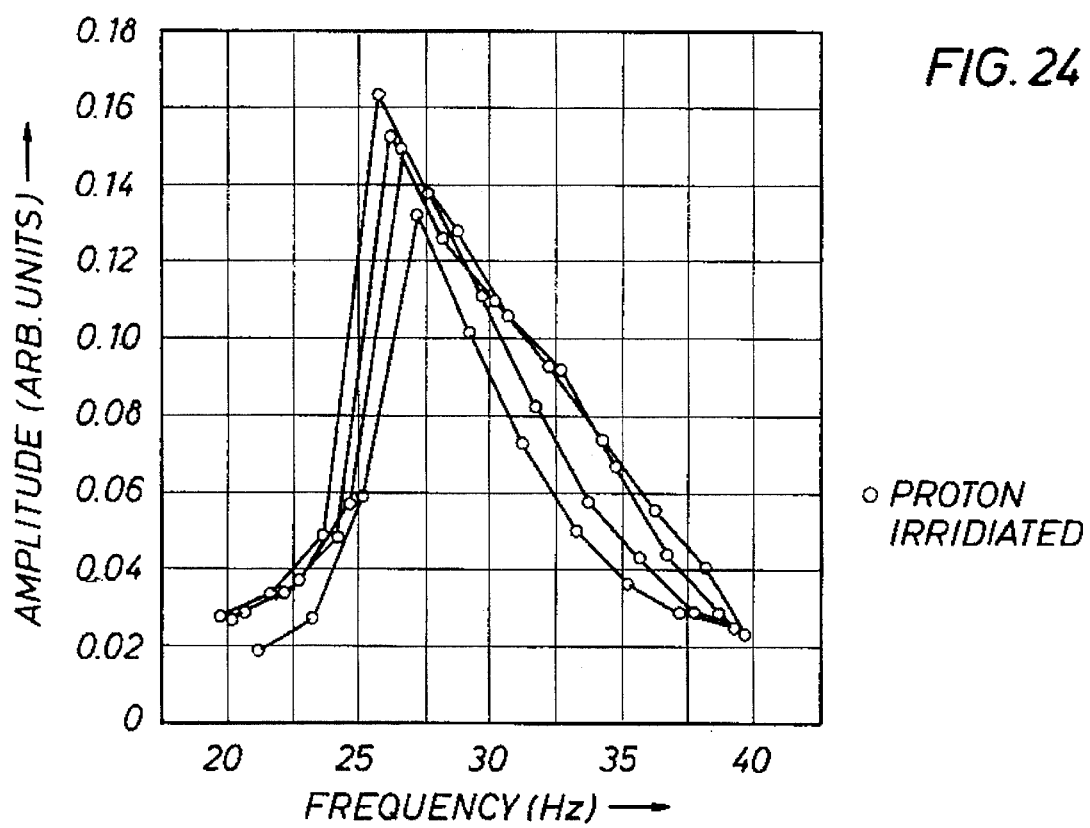

FIG. 19 shows the static force hysteresis loops from moving the striped magnet back and forth with a span of 0.1 mm at a distance of 0.3 mm above a sample of (a) free sintered YBCO, (b) melt-textured YBCO, and (c) melt-textured YBCO irradiated with protons at 200 MeV. The static force hysteresis loops show that the stiffness and the maximum force sustained increases in the order of: free sintered YBCO<melt-textured YBCO<irradiated melt-textured YBCO. It should also be noted however, that the hysteresis loop of the melt-textured YBCO is more open than that of the irradiated melt-textured YBCO.

Figure 25:
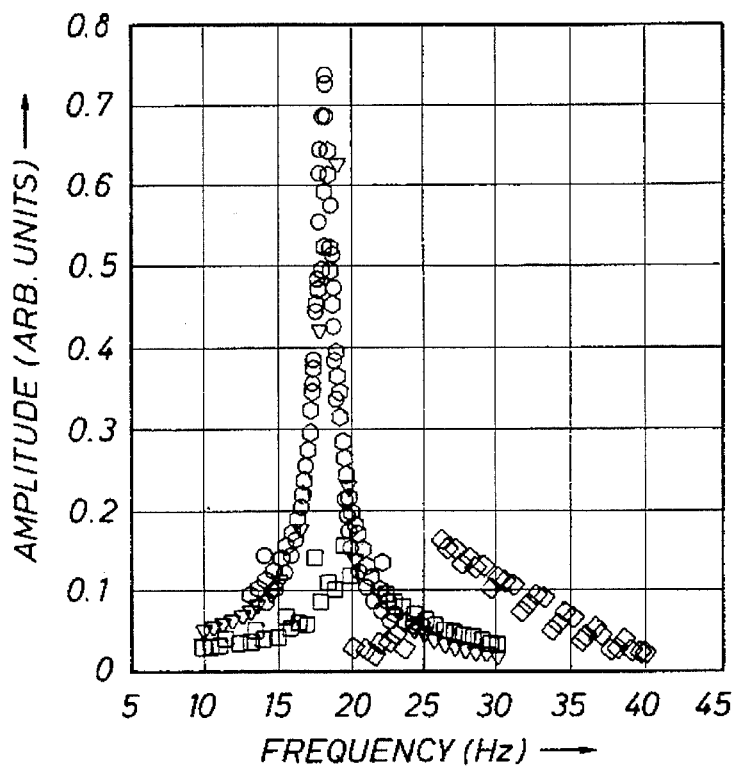
FIG. 25 is a composite of FIGS. 20–24.
Figure 26:
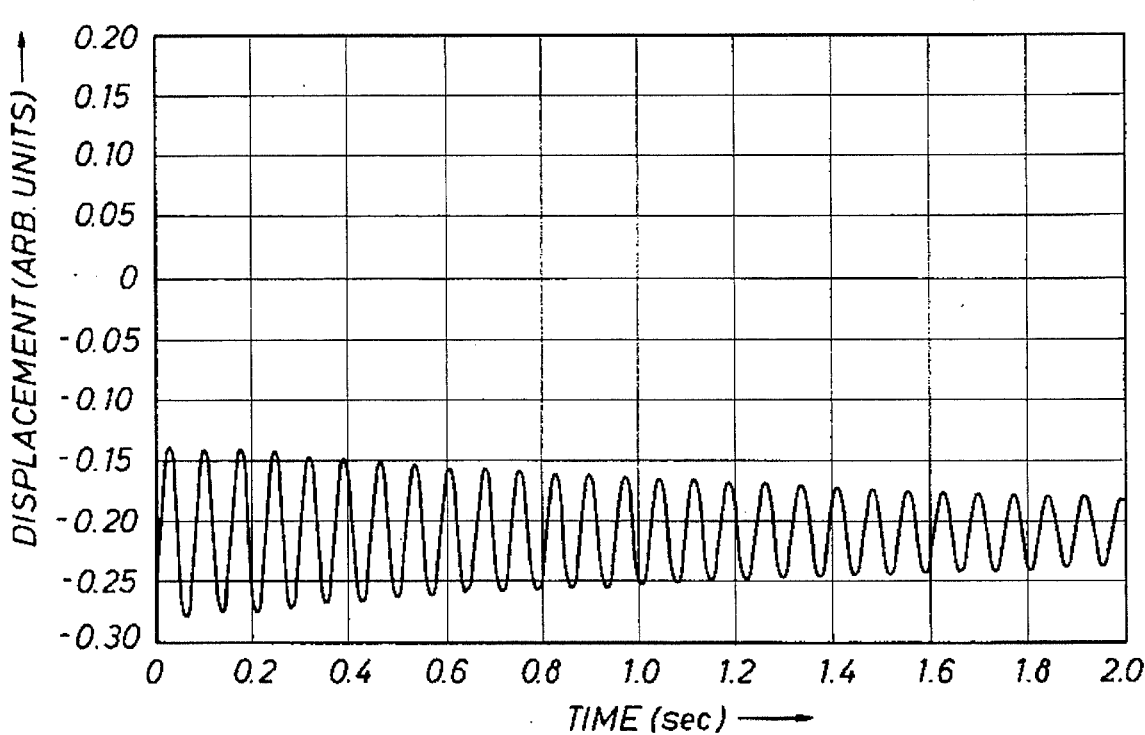
FIGS. 26, 27, 28, 29, and 30 show the natural vibrations of the catelever beam of FIG. 17a (displacement vs. time) with the striped magnet of FIG. 18b and with respectively: (a) free beam; (b) copper; (c) free sintered YBCO; (d) melt textured YBCO; and (e) proton irradiated YBCO.
Figure 27:
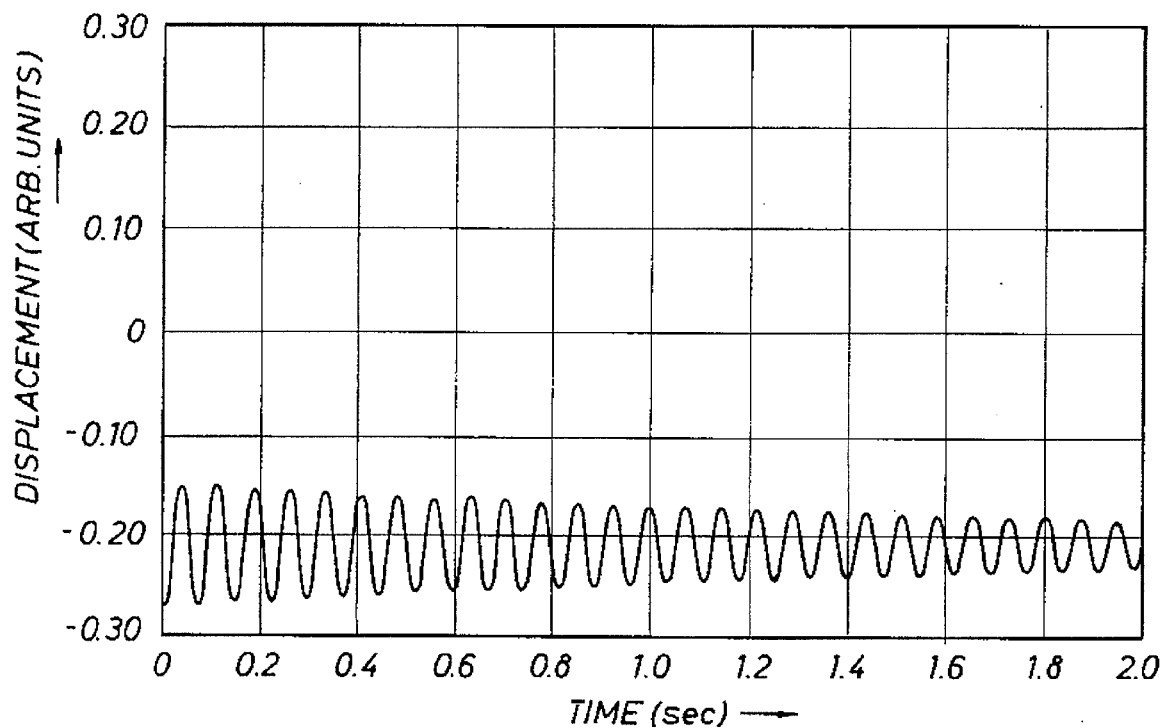
Figure 28:
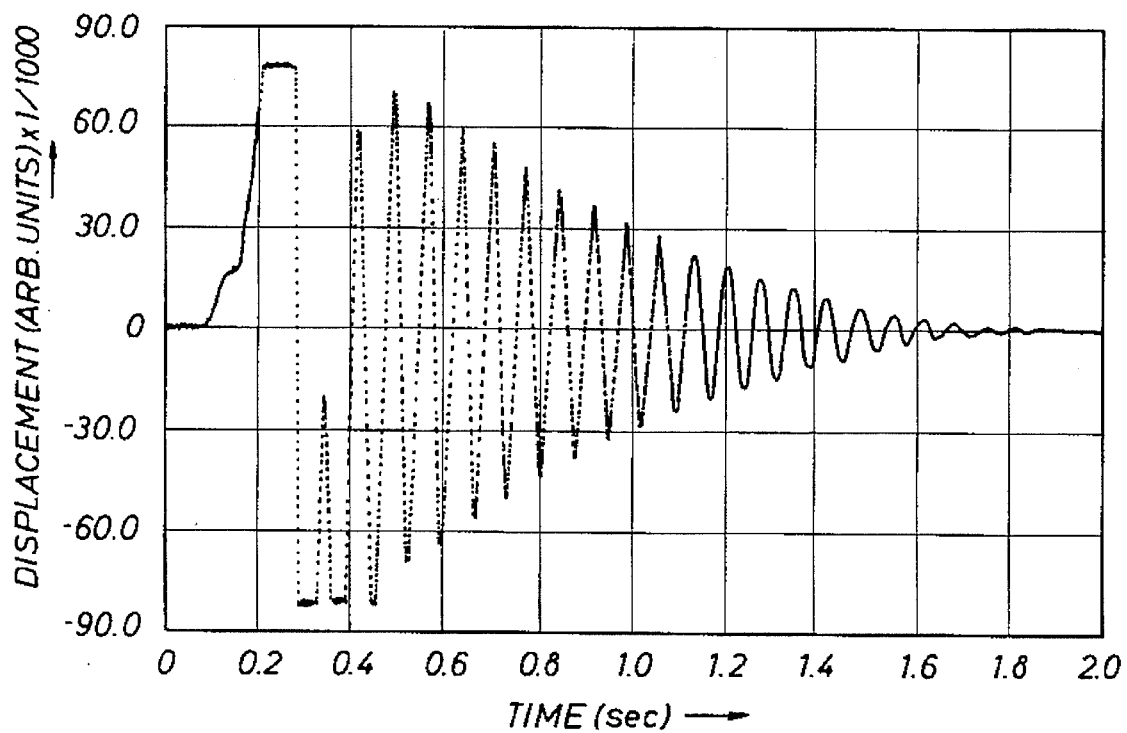
Figure 29:
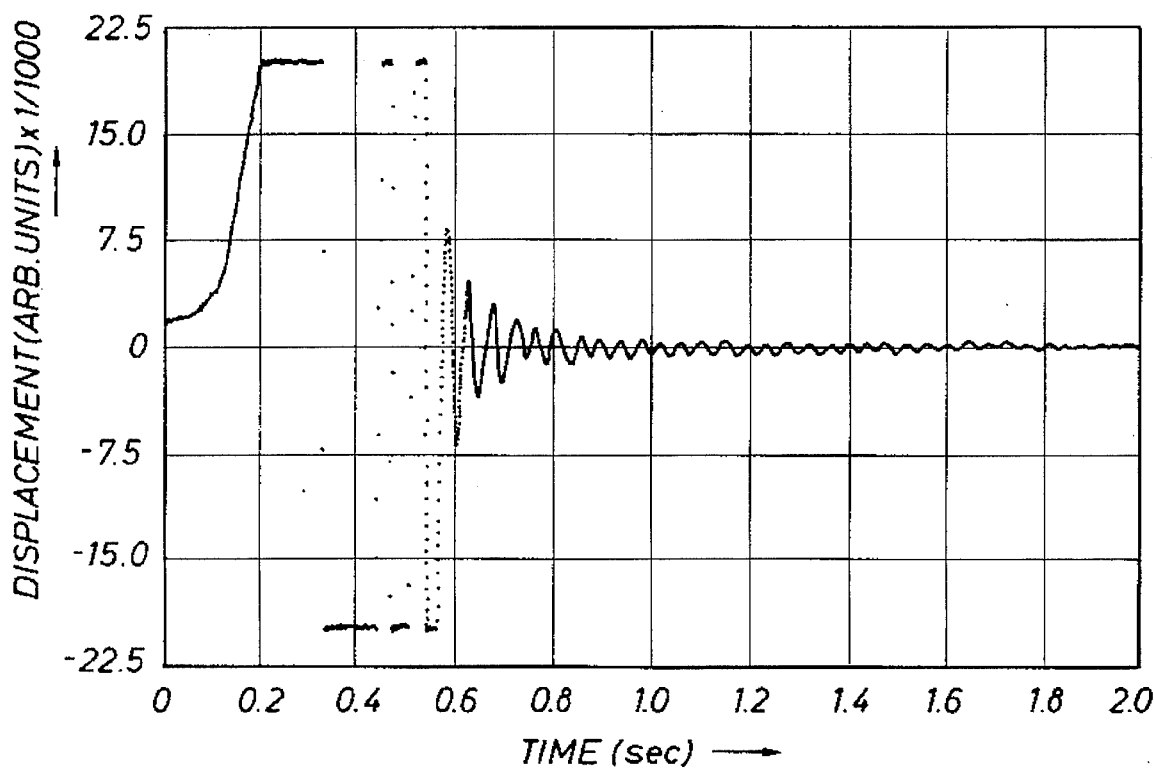
Figure 30:
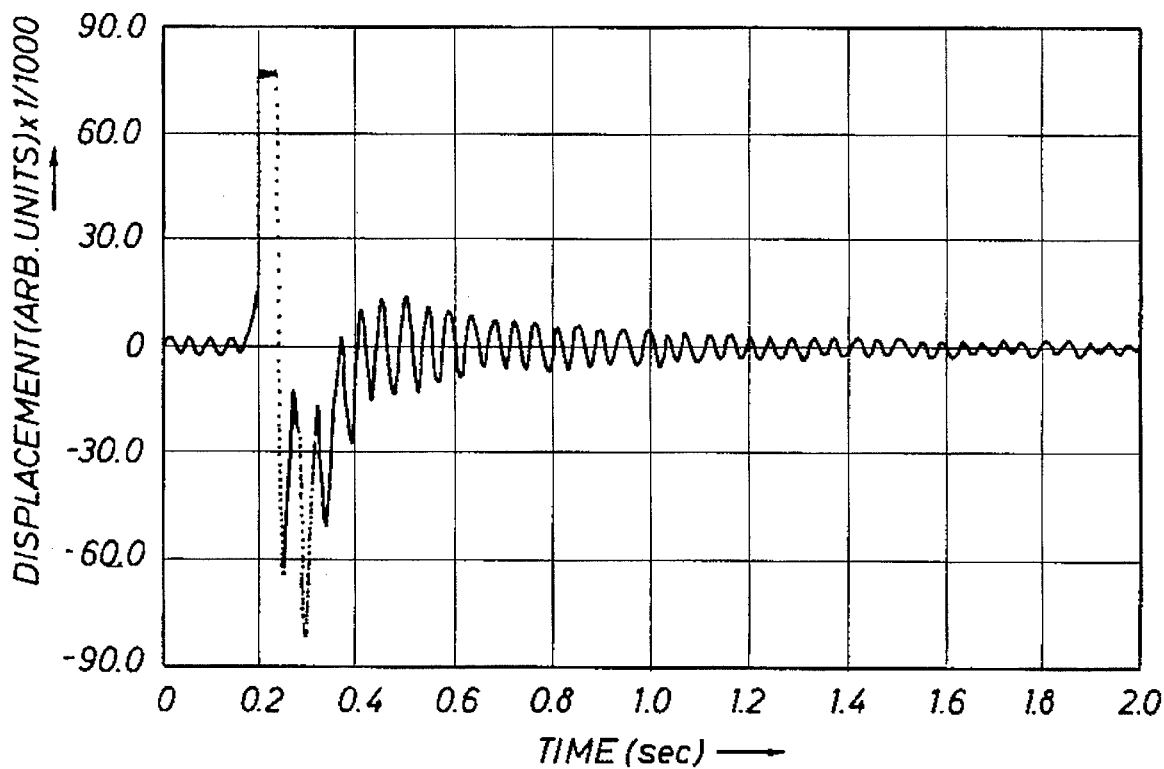

FIGS. 20–24 show respectively the resonance responses of the cantelever beam with the striped magnet (a) only; and with a sample of (b) Cu; (c) free sintered YBCO; (d) melt-textured YBCO; (e) irradiated (200 MeV protons) melt-textured YBCO. FIG. 25 is a composite of FIGS. 20–24.

FIGS. 26 through 30 show the natural vibrations of the catelever beam of FIG. 17a (displacement vs. time) with the striped magnet of FIG. 18b and with respectively: (a) free beam; (b) copper; (c) free sintered YBCO; (d) melt textured YBCO; and (e) proton irradiated YBCO.

The invention has been described with reference to its preferred embodiments. One skilled in the art may appreciate from this description changes or variations which may be made which do not depart from the scope or spirit of the invention described above and claimed hereafter.

We claim:

1. An apparatus for damping relative motion between a first and second member that are in proximity to each other, the apparatus comprising:

a magnet affixed to the first member having a magnetic field profile; and a superconductor which is affixed to the to the second member and that has been field cooled in the presence of a magnetic field having a checkerboard pattern, pinning the magnetic flux profile within the superconductor;

wherein the magnet and the superconductor are oriented such that as the first and second members move relative to each other, the magnetic field profile of the magnet will move through the pinned magnetic flux profile, and the magnetic field profile of the magnet and the pinned magnetic flux profile are such that as the magnetic field profile of the magnet moves through the pinned magnetic flux profile, the relative motion of the first and second members is damped.

2. An apparatus having two members in non-contacting proximity to each other wherein motion by one member relative to the other member is altered by a pinned magnetic flux profile, comprising:

a magnet having a magnetic field profile affixed to one of the members;

a superconductor affixed to the other member which upon field cooling in the presence of a magnetic field pins the magnetic flux profile within the superconductor wherein the magnetic field profile of the magnet and the pinned magnetic flux profile are such that as the magnetic field profile of the magnet moves through the pinned magnetic flux profile within the superconductor, momentum is transferred from one member to the other member.

3. An apparatus having two members in non-contacting proximity to each other wherein motion by one member relative to the other member is altered by a pinned magnetic flux profile, comprising:

a magnet having a magnetic field profile affixed to one of the members;

a superconductor affixed to the other member which upon field cooling in the presence of a magnetic field pins the magnetic flux profile within the superconductor, said members being in such proximity to each other such that as one member rotates relative to the other the magnetic field profile of the magnet will move through the pinned magnetic flux profile, and the magnetic field profile of the magnet and the pinned magnetic flux profile are such that as the magnetic field profile of the magnet moves through the pinned magnetic flux profile, the relative angular velocity of the members is damped.

4. An apparatus having two members in non-contacting proximity to each other wherein motion by one member relative to the other member is altered by a pinned magnetic flux profile, comprising:

a magnet having a magnetic field profile affixed to one of the members;

a superconductor affixed to the other member which upon field cooling in the presence of a magnetic field pins the magnetic flux profile within the superconductor, said members being in such proximity to each other and the magnetic field profile of the magnet and the pinned magnetic flux profile are such that as one member moves relative to the other the magnetic field profile of the magnet moves through the pinned magnetic flux profile within the superconductor to transfer angular momentum from one member to the other member.

* * * * *